US011845496B2

United States Patent
Nakamura et al.

(10) Patent No.: US 11,845,496 B2
(45) Date of Patent: Dec. 19, 2023

(54) VIBRATION DAMPING STRUCTURE

(71) Applicant: Mazda Motor Corporation, Hiroshima (JP)

(72) Inventors: Kaito Nakamura, Hiroshima (JP); Miho Kurata, Hiroshima (JP); Sakayu Terada, Hiroshima (JP); Shuhei Narita, Hiroshima (JP); Daisuke Yamada, Hiroshima (JP); Toshitaka Miyoshi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 75 days.

(21) Appl. No.: 17/667,545

(22) Filed: Feb. 9, 2022

(65) Prior Publication Data

US 2022/0324520 A1 Oct. 13, 2022

(30) Foreign Application Priority Data

Mar. 31, 2021 (JP) ................. 2021-059343

(51) Int. Cl.
*B62D 25/20* (2006.01)
*B62D 25/06* (2006.01)

(52) U.S. Cl.
CPC .............. *B62D 25/20* (2013.01); *B62D 25/06* (2013.01)

(58) Field of Classification Search
CPC ......... B62D 25/20; B62D 25/06; F16F 15/02; B60N 3/04; B60R 13/0212
USPC ............................................ 296/193.07, 210
See application file for complete search history.

(56) References Cited

U.S. PATENT DOCUMENTS

| | | | | |
|---|---|---|---|---|
| 7,014,256 B2* | 3/2006 | Kamura | ................. | B62D 25/20 296/193.07 |
| 7,140,966 B2* | 11/2006 | Jee | .................... | F16F 15/13438 464/68.4 |
| 2009/0102238 A1* | 4/2009 | Gomi | ................. | B62D 25/2036 296/193.07 |
| 2011/0079942 A1* | 4/2011 | Post, II | ............... | B60R 13/0815 296/193.04 |
| 2019/0168690 A1 | 6/2019 | Shigihara | | |

FOREIGN PATENT DOCUMENTS

| | | |
|---|---|---|
| CN | 102705437 A | 10/2012 |
| JP | H10-39875 A | 2/1998 |
| JP | 2019-98988 A | 6/2019 |

OTHER PUBLICATIONS

Office Action dated May 26, 2023, in corresponding Chinese patent Application No. 202111596325.7, 8 pages.

* cited by examiner

*Primary Examiner* — Pinel E Romain
(74) *Attorney, Agent, or Firm* — XSENSUS LLP

(57) ABSTRACT

A vibration damping structure includes a panel which is a structure and a damping member joined to the panel. The damping member has a plurality of joined portions joined to a mating surface of the panel through respective joined surfaces in the X direction, and a plurality of spacing portions recessed toward the side opposite to the panel in the Z direction between adjacent joined portions. The damping member is formed such that the damping member is higher in damping than the panel and a resonance frequency of the damping member is formed such that it is substantially the same as a primary resonance frequency of the panel.

18 Claims, 21 Drawing Sheets

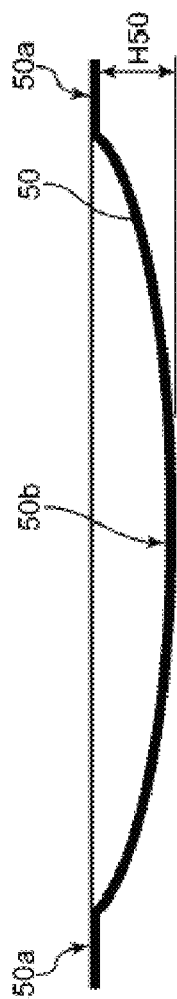
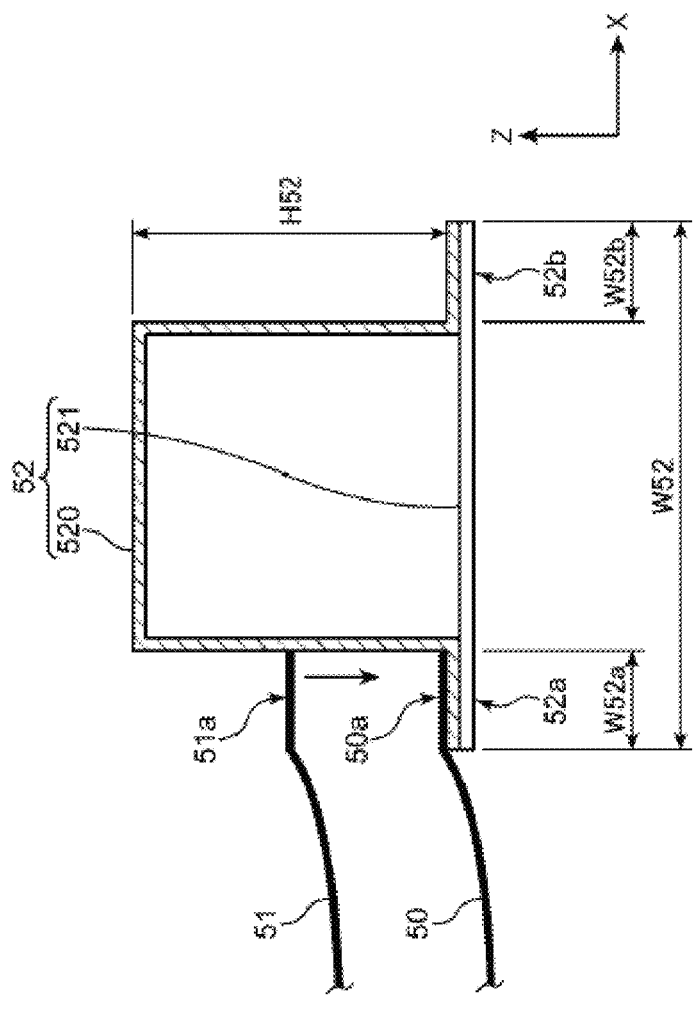
FIG. 4A
FIG. 4B (a)

VIBRATION DAMPING STRUCTURE

CROSS-REFERENCE TO RELATED APPLICATION

The present application claims priority to Japanese Patent Application 2021-059343, filed Mar. 31, 2021, the entire contents of which are incorporated herein by reference.

BACKGROUND

Field

The present disclosure relates to a vibration damping structure.

Description of the Related Art

Various techniques for damping vibration have been adopted in vehicle bodies of vehicles, structures of buildings, and the like. For example, Patent Literature 1 discloses a technique for damping vibration of a floor panel in a vehicle body.

In the technique disclosed in Patent Literature 1, for each area surrounded by a frame member in the floor panel, the frame member is bent in a wave shape, thereby enhancing the rigidity of the floor panel so that the resonance frequency is set higher. Furthermore, in the technique disclosed in Patent Literature 1, a vibration damping portion is stacked on a surface of an outer edge portion of each area. The vibration damping portion in Patent Literature 1 is formed in a layered shape by coating. According to Patent Literature 1, forming the vibration damping portion on the outer edge portion of each area can damp vibration of the floor panel.

CITATION LIST

Patent Literature

[Patent Literature 1] Japanese Patent Laid-Open No. 2019-98988

Summary Technical Problems

Various structures such as vehicles and buildings are required to have a further enhanced vibration damping effect. For further enhancement of the vibration damping effect, for example, it is also considered to reduce the rigidity of the structure itself.

However, in the case of reducing the rigidity of the structure itself, problems occur in that, for example, the structure contacts a member disposed around the structure, and the rigidity of a vehicle body or building including the structure cannot be secured.

The present disclosure has been made to solve the problems as described above, and an object of the present disclosure, among other objects, is to provide a vibration damping structure that can obtain a high vibration damping effect without reducing rigidity of a structure itself.

Means for Solving the Problems

A vibration damping structure according to one form of the present disclosure includes a first member which is a structure and a second member joined to the first member. The second member, in an area facing the first member, has one or more joined portions joined to the first member, and one or more unjoined portions disposed adjacent to the joined portions and not joined to the first member. The second member is formed such that the second member is higher in damping than the first member and such that a resonance frequency of the second member is substantially the same as a resonance frequency of the first member.

In the vibration damping structure according to the above form, the second member attached to the first member has the joined portion and the unjoined portion. The second member is formed so as to be higher in damping than the first member (so as to have a larger loss coefficient). Furthermore, the resonance frequency of the second member is set to be substantially the same as the resonance frequency of the first member. In the vibration damping structure according to the above form, vibration is input from the first member to the second member via the joined portion, and the unjoined portion of the second member resonates without being constrained by the first member. Accordingly, in the vibration damping structure according to the above form, strain energy can be stored in the joined portion of the second member.

Therefore, in the vibration damping structure according to the above form, a high vibration damping effect can be obtained without reduction in rigidity of the first member which is a structure.

Note that in the above form, the term "substantially the same" means not only coincidence of the resonance frequency of the second member and the resonance frequency of the first member but also inclusion of a frequency region corresponding to a range of a peak of the resonance frequency of the first member. The definition will be described later more specifically.

In the vibration damping structure according to the above form, it is also possible that the unjoined portion of the second member is formed so as to be spaced apart from the first member with an interval.

In the vibration damping structure according to the above form, the unjoined portion of the second member is spaced apart from the first member with the interval. Thus, in the case where vibration is input from the first member, resonance in the unjoined portion is hardly constrained by the first member.

In the vibration damping structure according to the above form, it is also possible that the second member has at least a plurality of the joined portions, and that a spacing surface of the unjoined portion which is spaced apart from the first member has no through hole penetrating in the direction opposite to the first member in the joined direction of the first member and the second member.

In the vibration damping structure according to the above form, the spacing surface has no through hole. Thus, the resonance mode when the unjoined portion of the second member resonates by vibration input from the first member is hardly inhibited.

In the vibration damping structure according to the above form, it is also possible that the joined portion is a rib-shaped portion provided to protrude toward the side of the first member from the spacing surface in the joined direction.

In the vibration damping structure according to the above form, the joined portion is formed as the rib-shaped portion, so that the resonance mode when the unjoined portion of the second member resonates by vibration input from the first member is hardly inhibited.

In the vibration damping structure according to the above form, it is also possible that the unjoined portion is formed having a first recess recessed toward the side opposite to the first member in the joined direction, that the second member, in an area on the side opposite in the joined direction to the area facing the first member, has a second recess formed so as to be recessed toward the first member in the joined direction from a periphery, and that the first recess and the second recess in the second member are disposed so as to overlap with each other when the second member is viewed in plan from the joined direction.

In the vibration damping structure according to the above form, the first recess and the second recess are disposed so as to overlap with each other in the plan view, so that the resonance mode when the unjoined portion of the second member resonates is hardly inhibited. That is, it is considered that if a structural member is attached to the second member on the side opposite to the side attached to the first member, the resonance mode of the unjoined portion is inhibited by the structural member. In contrast, in the vibration damping structure according to the above form, the second recess is disposed on the back side of the first recess, so that the resonance mode when the unjoined portion resonates is hardly inhibited.

In the vibration damping structure according to the above form, it is also possible that the second member has a plurality of the joined portions and a plurality of the unjoined portions, and that in the second member, the joined portions and the unjoined portions are alternately disposed in the direction orthogonal to the joined direction of the first member and the second member.

In the vibration damping structure according to the above form, the second member is formed with the structure in which the joined portions and the unjoined portions are alternately disposed in the orthogonal direction. Thus, in the vibration damping structure according to the above form, a plurality of resonance surfaces are provided, so that it becomes easier to match the resonance point of the second member with the resonance point of the first member.

In the vibration damping structure according to the above form, it is also possible that the joined portions of the second member are formed having a lattice shape when the joined portions and the first member are viewed in plan from the joined direction.

In the vibration damping structure according to the above form, the joined portions of the second member are formed in the lattice shape in the plan view. Accordingly, in the vibration damping structure according to the above form, a plurality of resonance surfaces are provided in the two-dimensional direction intersecting the joined direction of the first member and the second member. Therefore, in the vibration damping structure according to the above form, it is further advantageous in matching the resonance point of the second member with the resonance point of the first member.

In the vibration damping structure according to the above form, it is also possible that the second member is formed such that the resonance frequency of the second member is substantially the same as a primary resonance frequency of the first member.

In the vibration damping structure according to the above form, the second member is formed such that the resonance frequency of the second member is substantially the same as the primary resonance frequency of the first member. The inventors of the present application have confirmed that in the case where the resonance frequency of the second member and the primary resonance frequency of the first member are substantially the same, it can provide a higher effect in terms of energy absorption as compared with the case where the resonance frequency of the second member is substantially the same as the higher order resonance frequency of the first member.

In the vibration damping structure according to the above form, it is also possible that the second member is formed such that a primary resonance frequency of the second member is substantially the same as a primary resonance frequency of the first member.

In the vibration damping structure according to the above form, the second member is formed such that the primary resonance frequency of the second member is substantially the same as the primary resonance frequency of the first member. The inventors of the present application have confirmed that in the case where the higher order resonance frequency of the second member and the primary resonance frequency of the first member are substantially the same, it can only provide a lower effect in terms of energy absorption as compared with the vibration damping structure according to the above form in which the primary resonance frequency of the second member and the primary resonance frequency of the first member are substantially the same. Accordingly, in the vibration damping structure according to the above form, the primary resonance frequency of the second member is substantially the same as the primary resonance frequency of the first member, so that more effective vibration damping is possible.

In the vibration damping structure according to the above form, it is also possible that the second member is formed with a porous material.

In the vibration damping structure according to the above form, the second member is formed with the porous material. Thus, effective vibration damping is possible while achieving weight reduction as compared with the case where the second member is formed with a solid material.

In the vibration damping structure according to the above form, it is also possible that the first member is a floor panel of a vehicle body, and that the second member is a floor mat attached to the vehicle cabin inner side of the floor panel.

In the vibration damping structure according to the above form, the floor panel is used for the first member, and the floor mat is used for the second member. Accordingly, effective damping of vibration in a floor portion of the vehicle body is possible.

In the vibration damping structure according to the above form, it is also possible that the first member is a roof panel of a vehicle body, and that the second member is a top ceiling attached to the vehicle cabin inner side of the roof panel.

In the vibration damping structure according to the above form, the roof panel is used for the first member, and the top ceiling is used for the second member. Accordingly, effective damping of vibration in a roof portion of the vehicle body is possible.

In the vibration damping structure according to the above form, it is also possible that the first member is formed with a metal material, and that the second member has a loss coefficient of 0.01 or more.

In the vibration damping structure according to the above form, the first member is formed with the metal material, and the loss coefficient of the second member is set to 0.01 or more. Accordingly, it is possible to obtain a remarkable effect of vibration damping as compared with the case where the vibration damping structure is not adopted.

In the vibration damping structure according to the above form, it is also possible that in the second member, the joined portion and the unjoined portion are integrally formed.

In the vibration damping structure according to the above form, the joined portion and the unjoined portion in the second member are integrally formed. Accordingly, vibration input from the first member via the joined portion is smoothly transmitted to the unjoined portion as compared with the case where the joined portion and the unjoined portion are separately formed. Therefore, in the vibration damping structure according to the above form, the unjoined portion of the second member resonates, so that it is advantageous in storing strain energy in the joined portion and also further advantageous in obtaining an effect of vibration damping.

Advantages

In the vibration damping structure according to each of the above forms, a high vibration damping effect can be obtained without reduction in rigidity of the first member itself which is a structure.

BRIEF DESCRIPTION OF THE DRAWINGS

FIG. 4A is a cross-sectional view illustrating a structure of a panel, and FIG. 4B is a cross-sectional view illustrating a structure of a jig frame.

DESCRIPTION OF EMBODIMENTS

Hereinafter, an embodiment of the present disclosure will be described with reference to the drawings. Note that the embodiment described below is an example of the present disclosure, and the present disclosure is not limited to the embodiment below in any way except for its inherent configurations.

1. Vibration Damping Structure 1

A vibration damping structure 1 according to an embodiment of the present disclosure will be described with reference to FIGS. 1 and 2. Note that the vibration damping structure 1 is schematically illustrated in FIGS. 1 and 2 and can be modified in various manners according to a position at which the vibration damping structure 1 is used, or the like.

Figure 1:
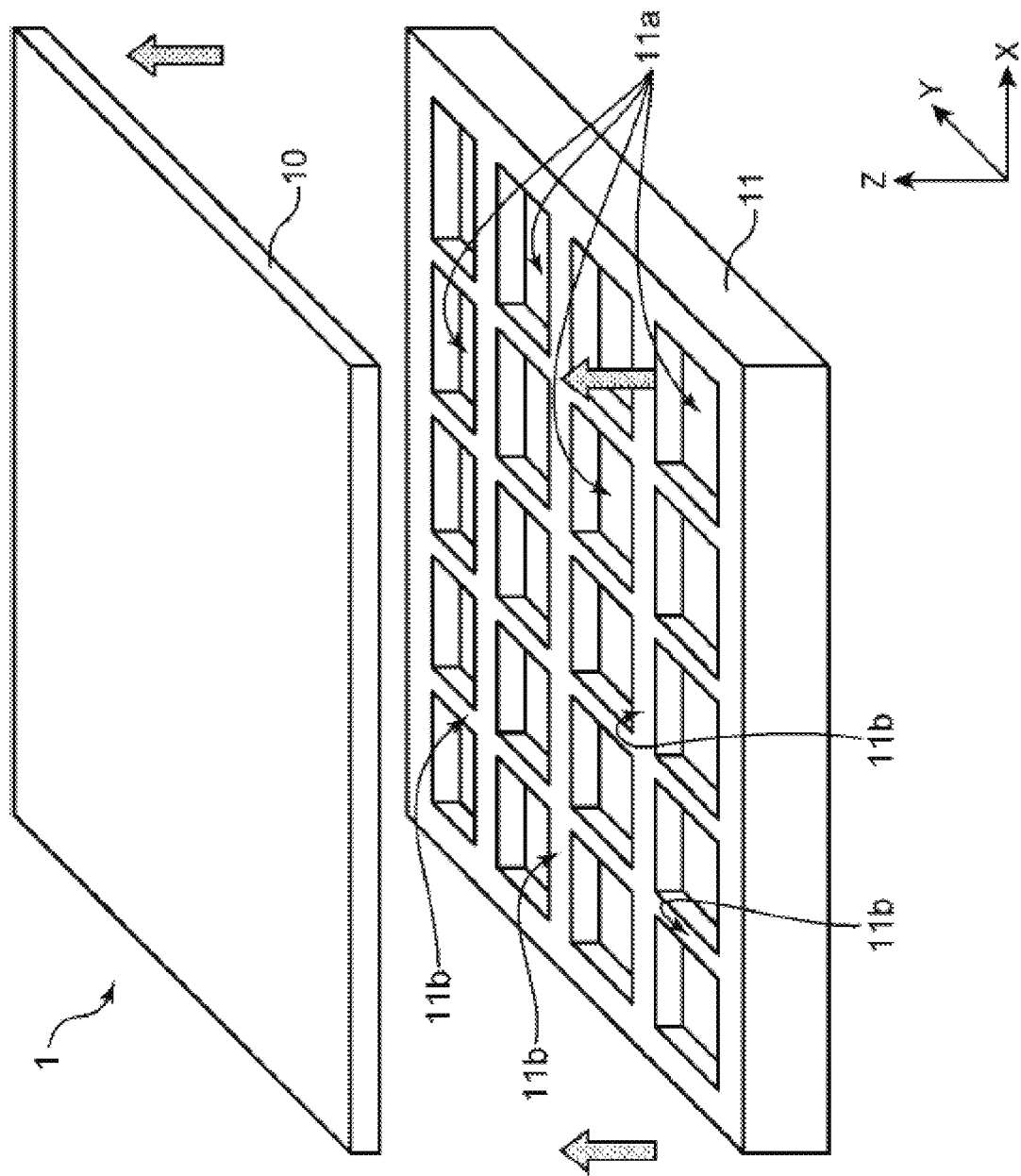
FIG. 1 is an exploded perspective view illustrating a vibration damping structure according to an embodiment of the present disclosure.
Figure 2:
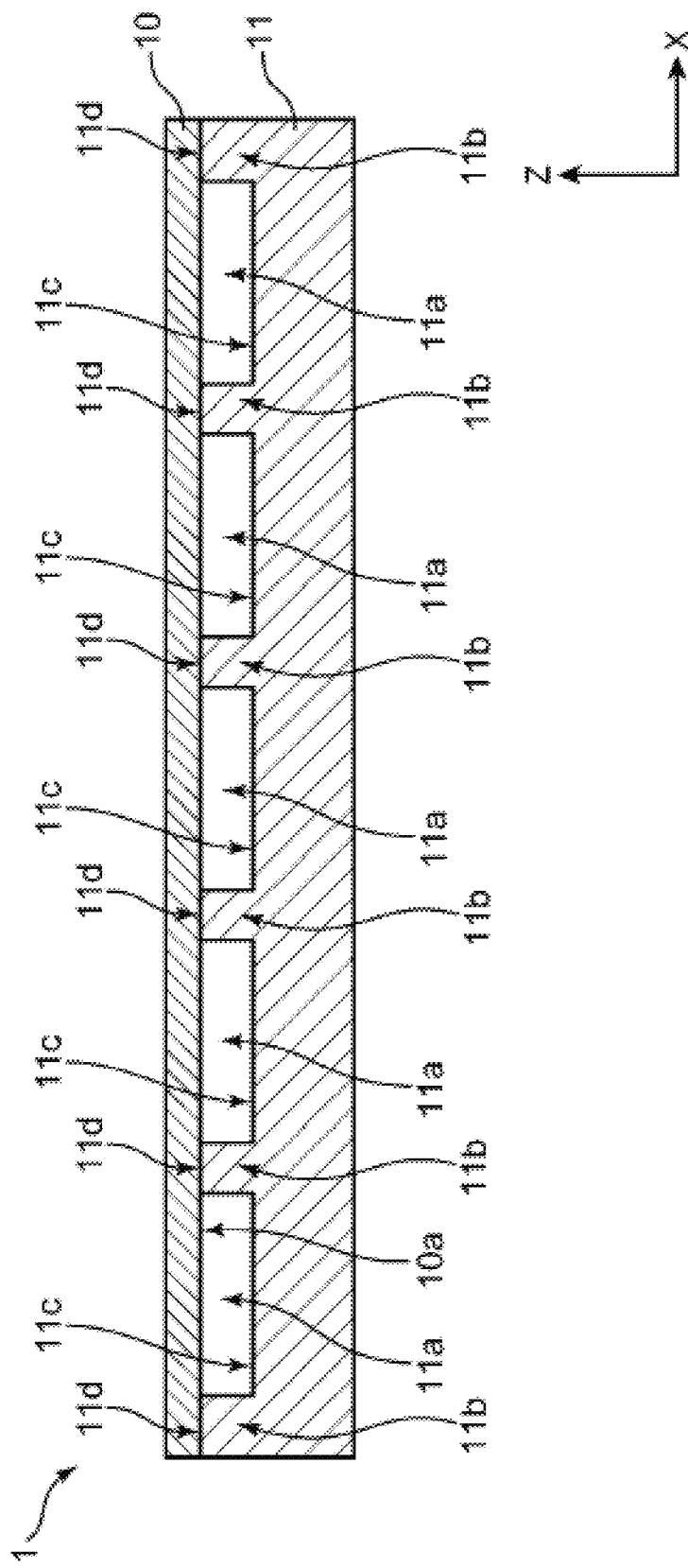
FIG. 2 is a cross-sectional view illustrating the vibration damping structure.

As illustrated in FIG. 1, the vibration damping structure 1 according to the present embodiment includes a panel (first member) 10 which is a structure and a damping member (second member) 11 joined to the panel 10. The panel 10 includes a metal material (for example, Fe), and a surface thereof extends in the X direction and the Y direction. The damping member 11 is formed of a foamed material (porous material) and has a plurality of spacing portions (unjoined portions) 11a disposed so as to be spaced apart from each other in the X direction and the Y direction. As illustrated in FIG. 2, the spacing portion 11a is a recess recessed toward the side opposite to the side on which the panel 10 is disposed in the Z direction.

A joined portion lib formed in a rib shape is provided between adjacent spacing portions 11a. The joined portion lib is joined to a mating surface 10a of the panel 10 on a joined surface 11d which is an end surface on the side on which the panel 10 is disposed in the Z direction. Note that the joined surface 11d and the mating surface 10a are joined together by self-adhering.

Furthermore, a bottom surface (spacing surface) 11c of the spacing portion (recess) 11a in the damping member 11 has no through hole penetrating in the Z direction. Note that the term "through hole" means a hole provided linearly from the bottom surface 11c and does not include one in which fine holes present in the foamed material forming the damping member 11 are connected.

As illustrated in FIG. 1, the joined portions lib of the damping member 11 are formed so as to extend in the X direction and the Y direction and have a lattice shape in a plan view from the Z direction. In the present embodiment, the spacing portions 11a and the joined portions lib are integrally formed.

Furthermore, in the vibration damping structure 1, the damping member 11 is formed so as to be higher in damping at a loss coefficient larger than that of the panel 10, and the primary resonance frequency of the damping member 11 is formed so as to be substantially the same as the primary resonance frequency of the panel 10. Note that the higher order resonance frequency of the damping member 11 may be substantially the same as the primary resonance frequency of the panel 10. Furthermore, the primary or higher order resonance frequency of the damping member 11 may be substantially the same as the higher order resonance frequency of the panel 10.

Here, the term "substantially the same" described above means not only coincidence of the primary resonance frequency of the damping member 11 and the primary resonance frequency of the panel 10 but also inclusion of a frequency region corresponding to a range of a peak of the primary resonance frequency of the panel 10. Specifically, it means a difference of the product of the resonance frequency of the panel 10 and √2 and the resonance frequency, and a frequency range obtained by adding or subtracting the difference to or from the resonance frequency.

2. Vibration Damping

In order to enhance a vibration damping property of a member, it is necessary to enhance (i) a strain energy sharing ratio indicating a strain energy rate of the member in the total and (ii) a loss coefficient of the member. The damping property is represented by the following expression.

$$\zeta_{total} = \frac{1}{2}\eta_{total} = \frac{1}{2}\sum_{m=1}^{m_{max}} \eta_m \sum_{e_m=1}^{e_{m,max}} \frac{U_{e_m}}{U_{total}}$$ [Expression 1]

In the relational expression, $\eta_m$ indicates a loss coefficient of the component m, $U_{e_m}$ indicates strain energy of the element $e_m$, and $U_{total}$ indicates total strain energy.

3. Analysis Using Analysis Model (1) Analysis Model 5

An analysis model 5 according to Example 1 used for analysis will be described with reference to FIGS. 3 and 4.

Figure 3:
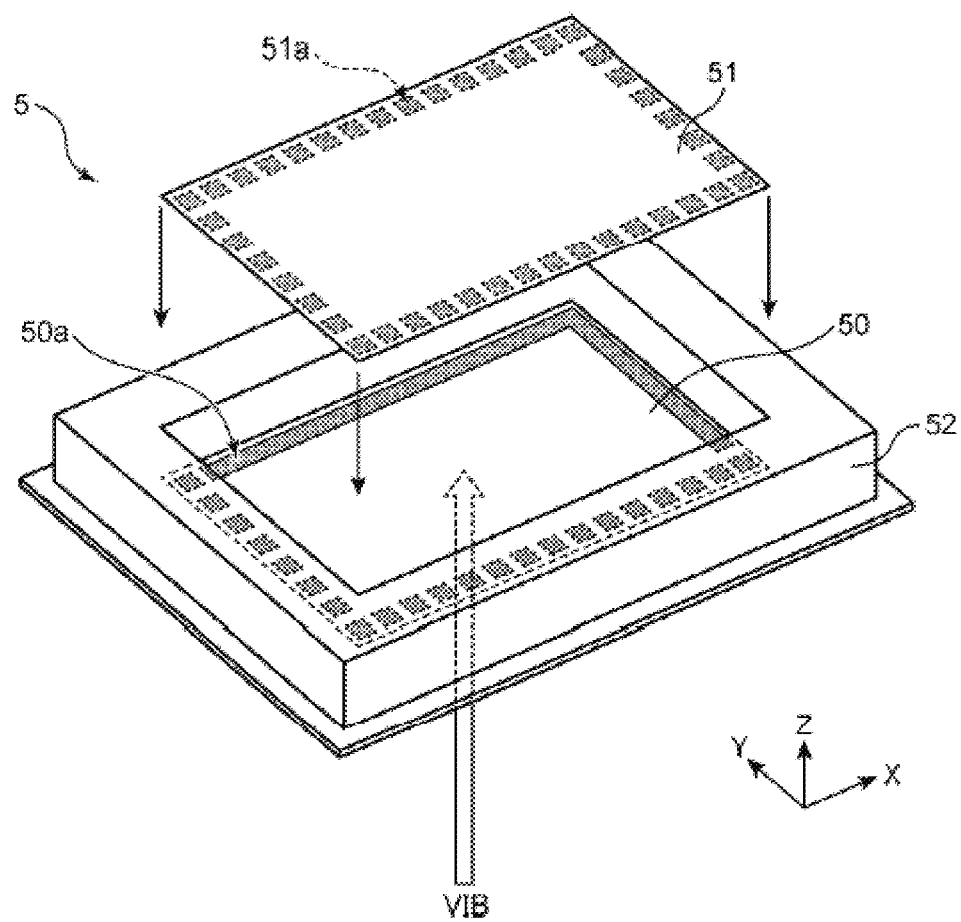
FIG. 3 is an exploded perspective view illustrating a configuration of an analysis model.

As illustrated in FIG. 3, the analysis model 5 has a panel (first member) 50, a damping member (second member) 51, and a jig frame 52. As illustrated in FIG. 4A, the panel 50 is a sweep curved panel of 200 mm×300 mm in which a bottom portion 50b thereof is located at a depth H50 (5 mm) with respect to a peripheral edge portion 50a thereof. The panel 50 is formed with Fe and has a thickness of 0.6 mm.

The damping member 51 is formed along the panel 50. That is, the damping member 50 is also formed so as to have a sweep curved surface.

As illustrated in FIG. 4B, the jig frame 52 is formed by joining a hat-shaped member 520 having a hat shape in cross section and a plate-shaped member 521 having a flat plate shape together. The jig frame 52 is formed with a height H52 of 50 mm and a width W52 of 80 mm, and an inner peripheral flange portion 52a thereof has a width W52a of 15 mm and an outer peripheral flange portion 52b thereof has a width W52b of 15 mm. As illustrated in FIG. 3, the jig frame 52 has a rectangular frame shape in a plan view from the Z direction.

As illustrated in FIG. 4B, the panel 50 is completely constrained by the peripheral edge portion 50a of the panel 50 being joined to the inner peripheral flange portion 52a of the jig frame 52. In the damping member 51, a peripheral edge portion 51a of the damping member 51 is joined to the peripheral edge portion 50a of the panel 50. In the analysis model 5, the peripheral edge portion 51a of the damping member 51 corresponds to the "joined portion," and a portion except for the peripheral edge portion 51a of the damping member 51 corresponds to the "unjoined portion."

Note that the damping member 51 that has been used has the following material characteristics.

Young's modulus: 80 MPa

Loss coefficient ratio (panel/damping member):0.3%

(2) Analysis Models According to Comparative Examples

In an analysis model according to Comparative Example 1, the damping member 51 is omitted in comparison with the analysis model 5 according to Example 1 illustrated in FIGS. 3 and 4.

In an analysis model according to Comparative Example 2, the panel 50 and the damping member 51 are joined together over the entire surfaces thereof in comparison with the analysis model 5 according to Example 1 illustrated in FIGS. 3 and 4.

(3) Analysis Conditions

As illustrated in FIG. 3, vibration was added to the panel 50 (VIB). Then, equivalent radiation power (ERP) for each frequency was used as an evaluation index. The ERP indicates an amount of energy radiation generated by vibration of the member and is represented by a function of the product of the vibration speed and the area.

(4) Analysis Results

Figure 5:
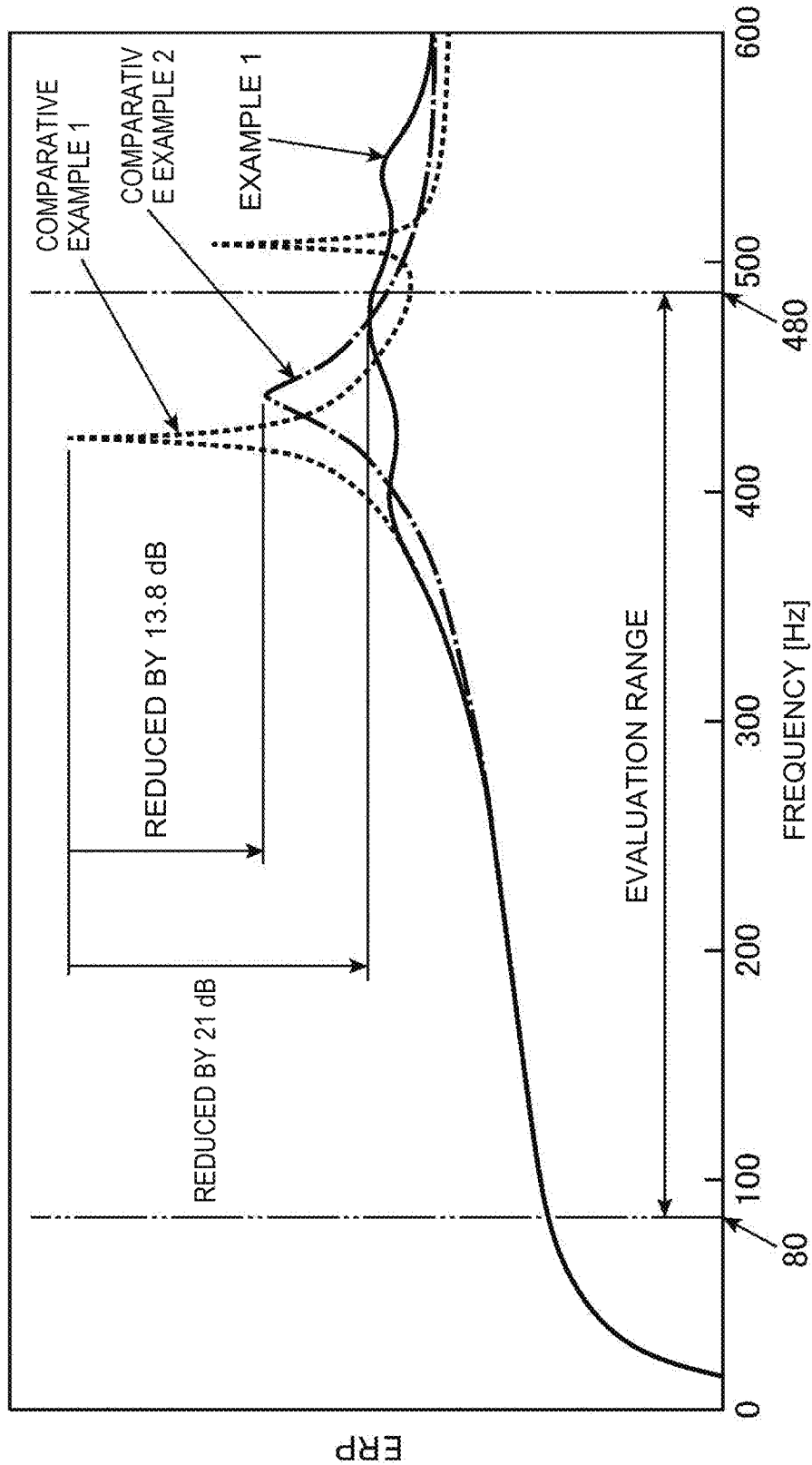
FIG. 5 is a graph illustrating an ERP (equivalent radiation energy) for each frequency in each of Example 1 and Comparative Examples 1 and 2.

As illustrated in FIG. 5, ERPs of Example 1 and Comparative Examples 1 and 2 were evaluated in an evaluation range of 80 Hz to 480 Hz. In the model according to Comparative Example 2, the ERP maximum value decreased by 13.8 dB from the ERP maximum value in the model according to Comparative Example 1. In the model 5 according to Example 1, the ERP maximum value decreased by 21 dB from the ERP maximum value in the model according to Comparative Example 1.

Figure 6A:
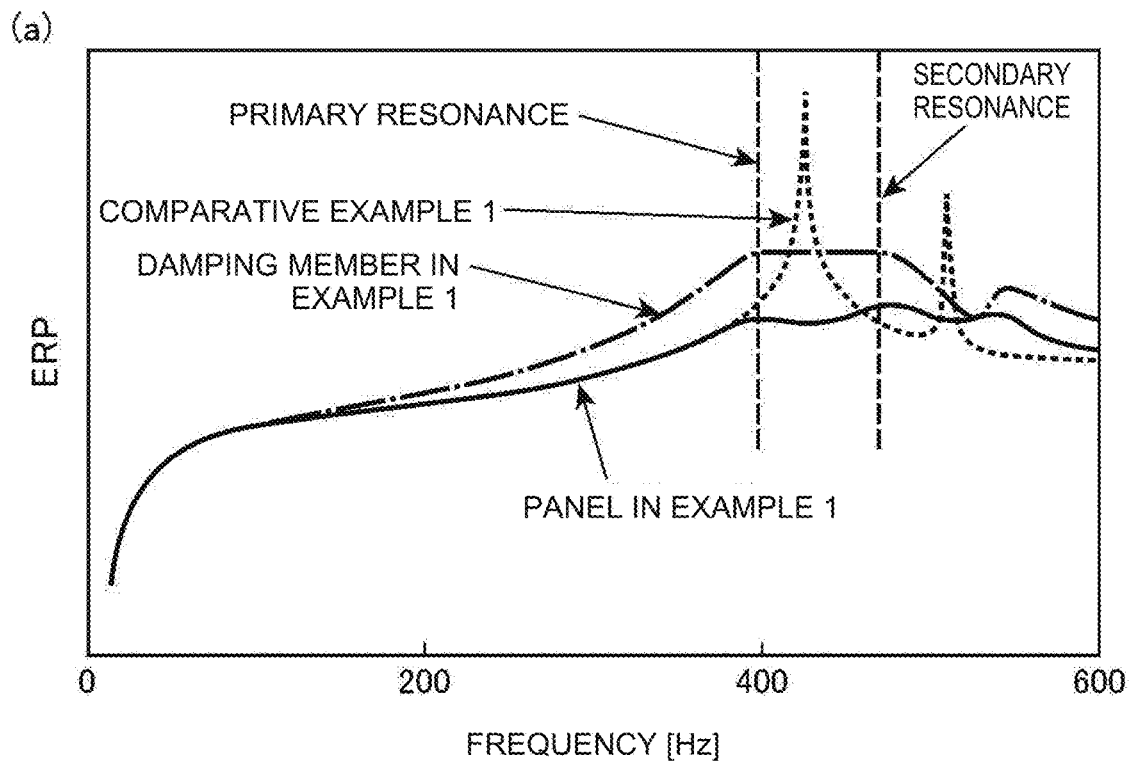
FIG. 6A is a graph illustrating an ERP for each frequency in each of Example 1 and Comparative Example 1.

As illustrated in FIG. 6A, in the analysis model 5 according to Example 1, the primary resonance frequency of the panel 50 and the primary resonance frequency of the damping member 51 are substantially the same, and the height of the peak can be kept low as compared with the primary resonance in the model according to Comparative Example 1 (a model with no damping member). That is, in the analysis model 5 according to Example 1, by providing the damping member 51 with the unjoined portion that is not joined to the panel 50, the damping member 51 can easily resonate, and the damping member 51 can be deformed by itself.

Figure 6B:
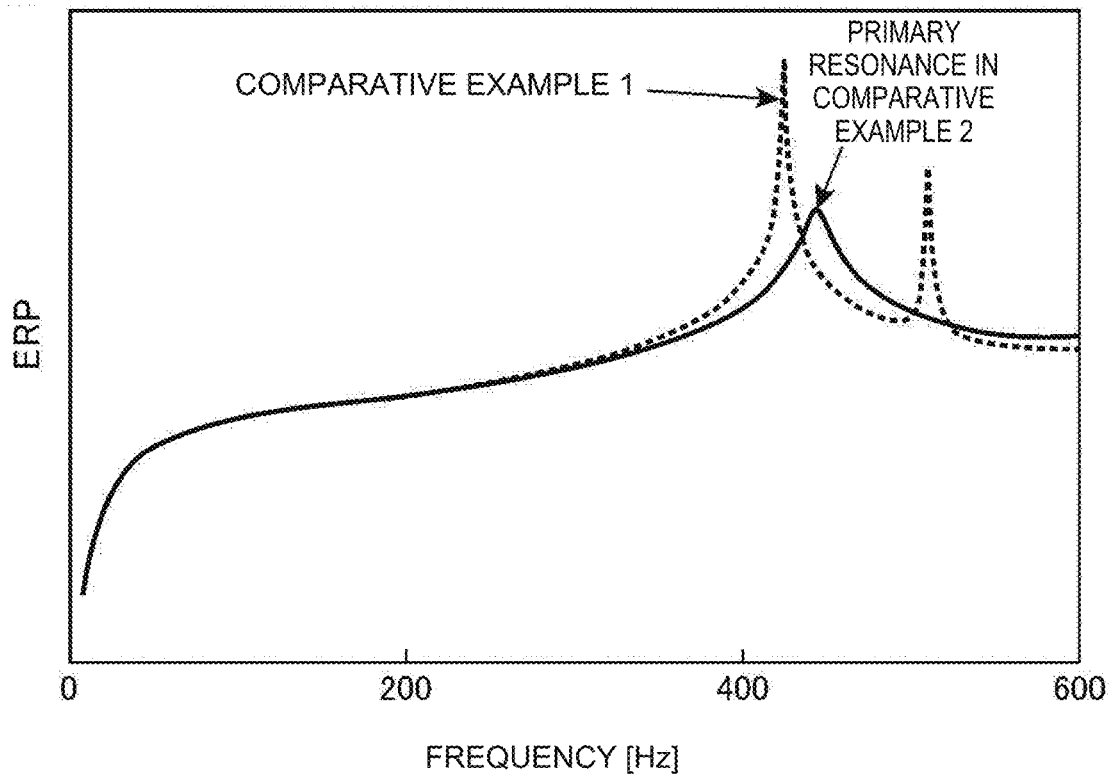
FIG. 6B is a graph illustrating an ERP for each frequency in each of Comparative Examples 1 and 2.

On the other hand, as illustrated in FIG. 6B, in the model according to Comparative Example 2, since the damping member 51 is joined to the panel 50, the ERP maximum value is lower than that in Comparative Example 1, but in the model according to the comparative example, since the damping member 51 is joined to the panel 50 over the entire surface thereof, the damping member 51 vibrates integrally with the panel 50. Accordingly, in the model according to Comparative Example 2, the vibration damping performance is lower than that in the analysis model 5 according to Example 1.

(5) Loss Energy

Table 1 illustrates results of comparison of the loss energy rates at the time of the primary resonance of the panel 50 in the respective models of Example 1 and Comparative Examples 1 and 2.

TABLE 1

|  | Comparative Example 1 | Comparative Example 2 | Example 1 |
| --- | --- | --- | --- |
| Damping member | — | 97.1% | 99.4% |
| Jig frame | 2.7% | 1.3% | 0.3% |
| Panel | 97.3% | 1.6% | 0.3% |

As illustrated in Table 1, in the model according to Comparative Example 1, since no damping member is provided, the loss energy rate of the panel 50 at the time of the primary resonance of the panel 50 is as large as 97.3%. In the model according to Comparative Example 2, since the panel 50 and the damping member 51 are joined together over the entire surfaces thereof, the loss energy rate of the panel 50 is 1.6%, which is kept significantly smaller than that in Comparative Example 1.

In the analysis model 5 according to Example 1, since the damping member 51 can vibrate with respect to an input of vibration from the panel 50 without being constrained by the panel 50 as described above, the loss energy rate of the panel 50 is reduced to 0.3%. That is, it is considered that in the analysis model 5 according to Example 1, resonance of the damping member 51 itself enabled to transmit more vibration energy of the panel 50 to the damping member 51, and the damping member 51 absorbed the energy, resulting in the reduction of the loss energy rate of the panel 50.

4. Young's Modulus of Damping Member

A relationship between the Young's modulus of the damping member and the ERP maximum value will be described with reference to FIGS. 7 and 8.

First, models according to Examples 2 and 3 as described below were prepared in addition to Example 1 and Comparative Examples 1 and 2.

(Example 2) A model having the same structure as that of Example 1 was used, and the Young's modulus of the damping member 51 was set to 40 MPa.

(Example 3) A model having the same structure as that of Example 1 was used, and the Young's modulus of the damping member 51 was set to 100 MPa.

Figure 7:
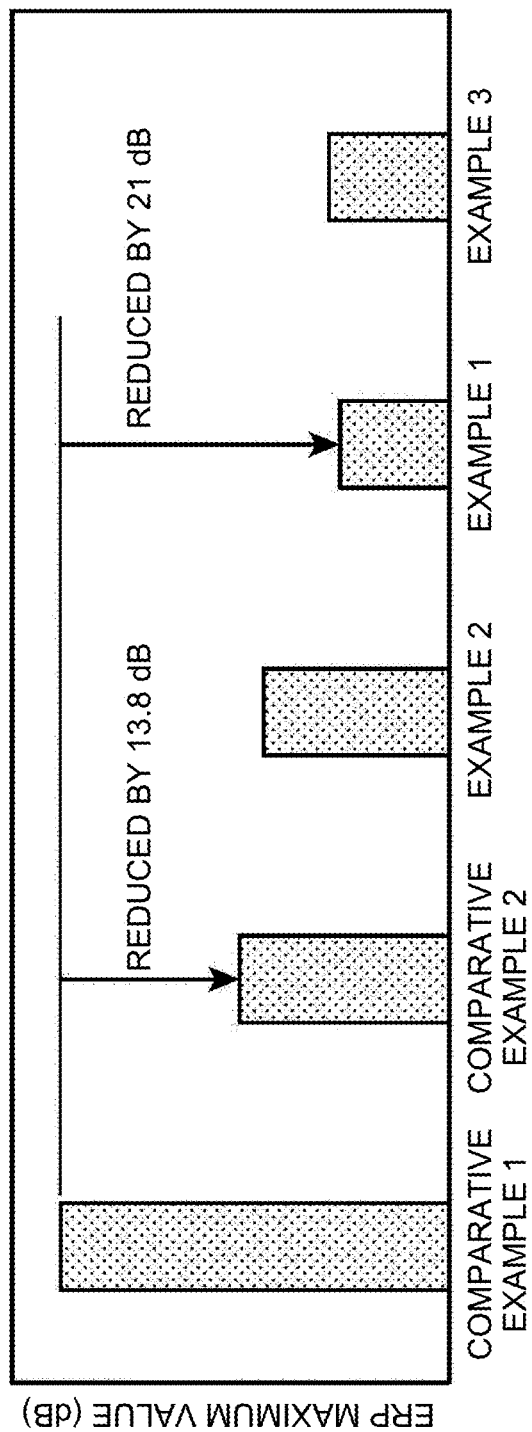
FIG. 7 is a graph illustrating an ERP maximum value in each of Examples 1 to 3 and Comparative Examples 1 and 2.

As illustrated in FIG. 7, in the analysis model 5 according to Example 1, the ERP maximum value could be reduced by 21 dB from that in the analysis model according to Comparative Example 1, whereas in the analysis model according to Example 2, although the degree of reduction is smaller than that in the analysis model 5 according to Example 1, the ERP maximum value could be more reduced than that in the analysis models according to Comparative Examples 1 and 2. In the analysis model according to Example 3, although the degree of reduction of the ERP maximum value is smaller than that in the analysis model 5 according to Example 1, the ERP maximum value could be more reduced than in the analysis models of Comparative Examples 1 and 2 and Example 2.

Figure 8A:
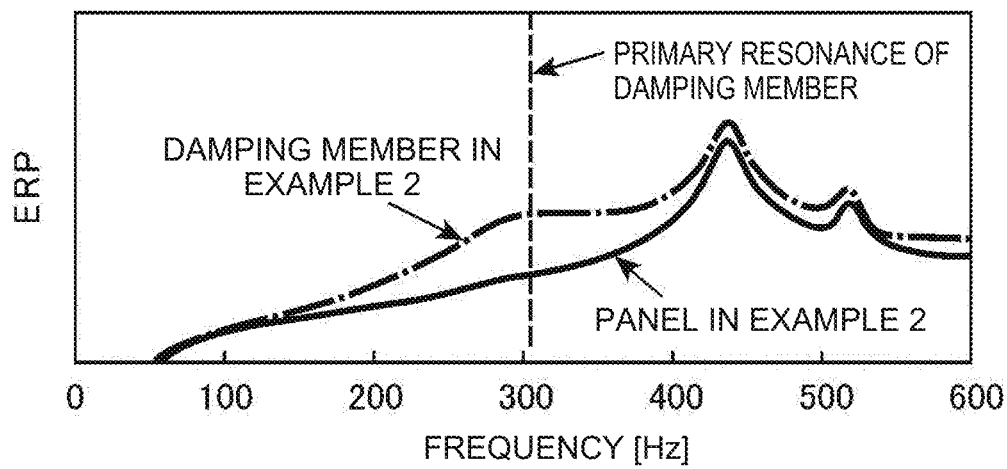
FIG. 8A is a graph illustrating an ERP for each frequency in Example 2.

As illustrated in FIG. 8A, in the graph in which the horizontal axis indicates frequency and the vertical axis indicates ERP, the primary resonance frequency of the damping member 51 is around 300 Hz in the analysis model according to Example 2, which is slightly away from the primary resonance frequency of the panel 50. Thus, it is considered that in the analysis model according to Example 2, the vibration damping effect of the panel 50 became lower than that in the analysis model 5 according to Example 1 illustrated in FIG. 8B.

Figure 8B:
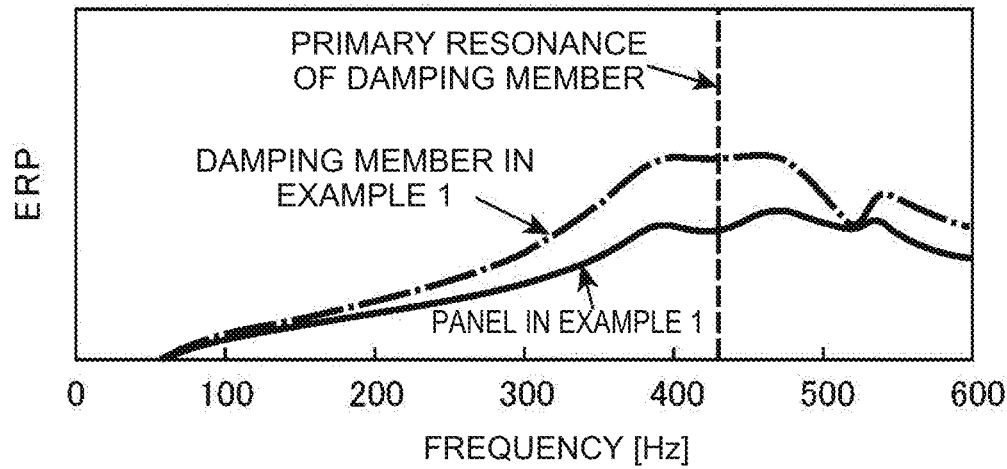
FIG. 8B is a graph illustrating an ERP for each frequency in Example 1.
Figure 8C:
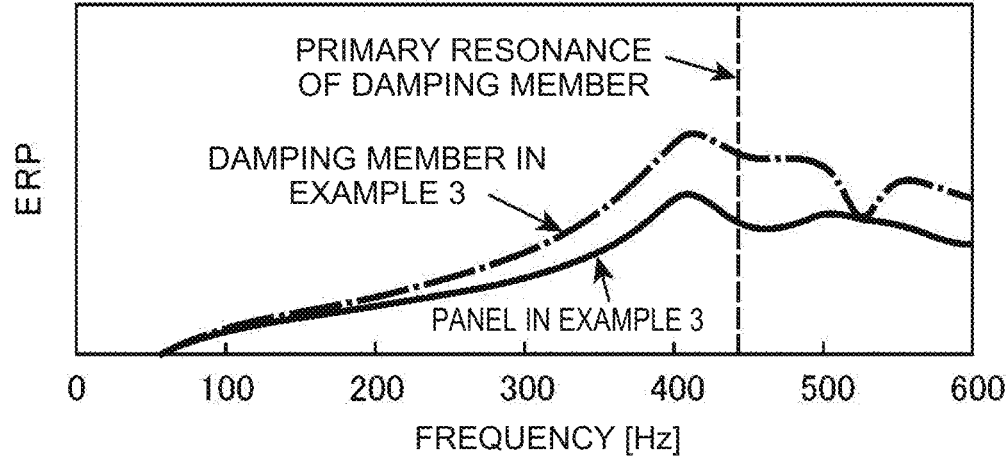
FIG. 8C is a graph illustrating an ERP for each frequency in Example 3.

On the other hand, as illustrated in FIGS. 8B and 8C, in the analysis model 51 according to Example 1 and the analysis model according to Example 3, the primary resonance frequency of the damping member 51 is very close to the primary resonance frequency of the panel 50, and accordingly it is considered that the vibration damping effect of the panel 50 could be obtained sufficiently. Specifically, as illustrated in FIG. 8B, in the analysis model 5 according to Example 1, by setting the Young's modulus of the damping member 51 to 80 MPa, the primary resonance frequency of the damping member 51 and the primary resonance frequency (substantially 420 Hz) of the panel 50 are substantially the same, and the ERP of the panel 50 was kept low.

Similarly, as illustrated in FIG. 8C, in the analysis model according to Example 3, the primary resonance frequency of the damping member 51, although slightly away from the primary resonance frequency of the panel 50 as compared with the analysis model 5 according to Example 1, is within substantially the same range as the primary resonance frequency of the panel 50, and accordingly the vibration damping effect of the panel 50 could be obtained.

Here, in Examples 1 to 3 illustrated in FIGS. 8A to 8C, the primary resonance frequency of the damping member 51 is within "substantially the same" range as the primary resonance frequency of the panel 50. The term "substantially the same" means not only coincidence of the primary resonance frequency of the damping member (second member) 51 and the primary resonance frequency of the panel (first member) 50 but also inclusion of a frequency region corresponding to a range of a peak of the primary resonance frequency of the panel 50. Specifically, when the primary resonance frequency of the panel 50 is Fr, a range from (Fr−α) to (Fr+α) can be defined as "substantially the same."

The above "α" can be calculated as follows.

(1) The resonance frequency Fr of the panel 50 is multiplied by $\sqrt{2}$ (Fr×$\sqrt{2}$).

(2) Fr is subtracted from (Fr×$\sqrt{2}$) ((Fr×$\sqrt{2}$)−Fr) to calculate α.

The range of "substantially the same" can be defined as described above.

5. Resonance Order of Damping Member

A relationship between a resonance order of a damping member and energy absorption in a vibration damping structure was examined. The results will be described with reference to FIG. 9. Note that in this examination, a damping member formed with a material as described below was used.

Young's modulus: 0.1 MPa

Loss coefficient ratio (panel/damping member):0.3%

Figure 9:
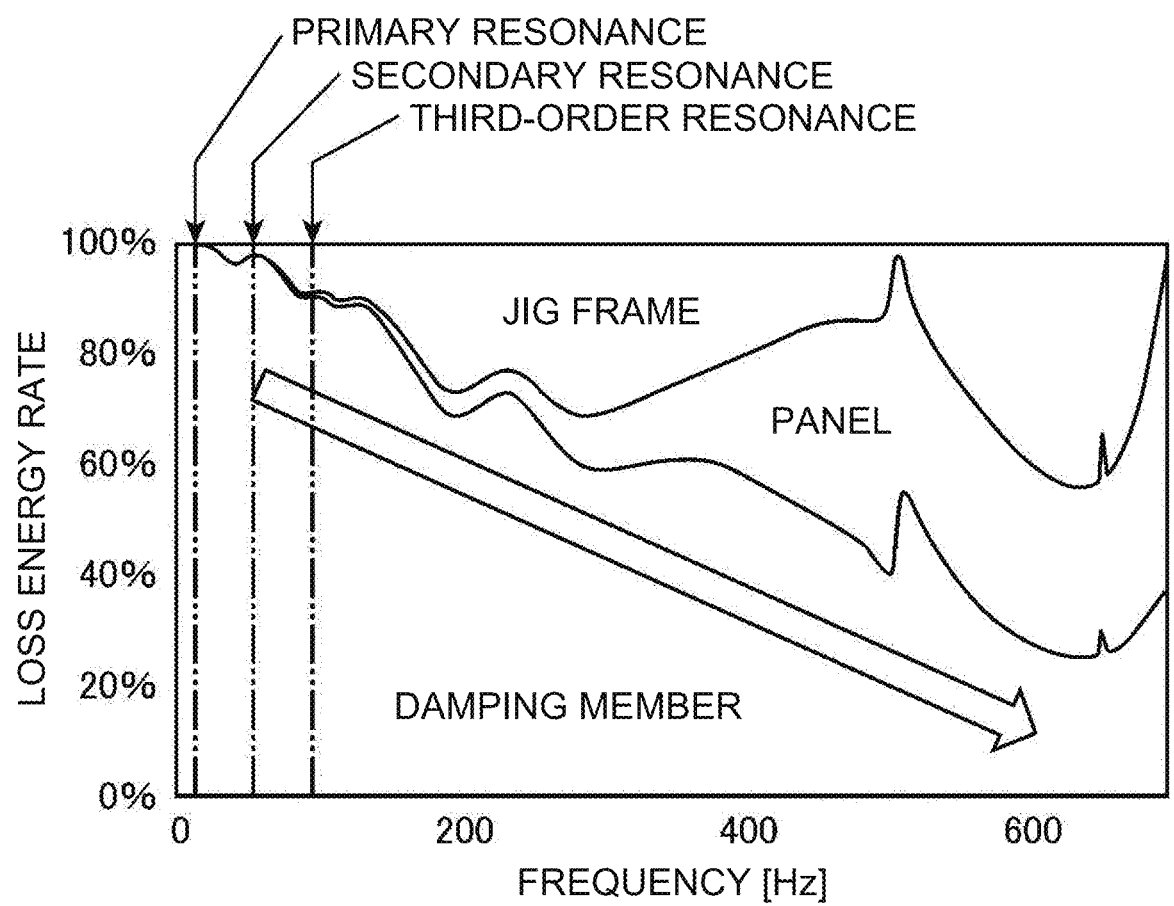
FIG. 9 is a graph illustrating a rate of contribution of a damping member for each resonance frequency.

As illustrated in FIG. 9, the higher the resonance order of the damping member, the lower the loss energy rate of the damping member. That is, the higher the resonance order of the damping member, the lower the contribution rate of the damping member to the loss energy.

Accordingly, making the primary resonance frequency of the damping member substantially the same as the primary resonance frequency of the panel is desired in terms of the fact that the contribution rate of the damping member in vibration damping of the panel can be increased. However, the secondary and third-order resonance frequencies of the damping member also contribute to vibration damping of the panel, and are not excluded.

6. Comparison with Model Using Dynamic Damper

Results of comparison of vibration damping between the analysis model 5 according to Example 1 and a model using a dynamic damper (hereinafter referred to as a "D/D") will be described with reference to FIGS. 10 and 11.

Figure 10A:
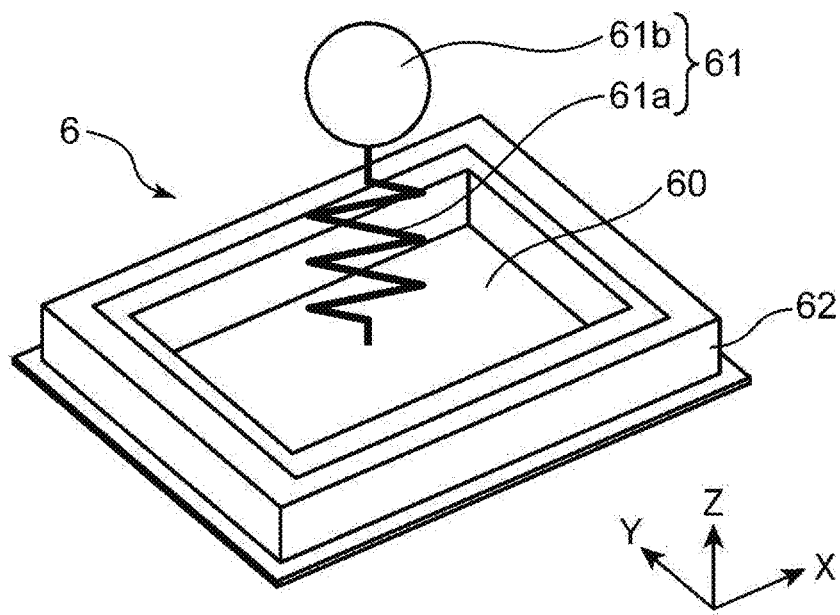
FIG. 10A is a perspective view illustrating a configuration of an analysis model according to Comparative Example 3.

As illustrated in FIG. 10A, a model 6 according to Comparative Example 3 using a D/D includes a panel 60, a D/D 61, and a jig frame 62. Structures of the panel 60 and the jig frame 62 are the same as those of the panel 50 and the jig frame 52 in the analysis model 5 according to Example 1.

The D/D 61 has a spring 61a connected to the center of the panel 60, and a concentrated mass 61b connected to a Z-direction upper portion of the spring 61a. The mass and loss coefficient of the concentrated mass 61b are set to be the same as those of the damping member 51 in the analysis model 5 according to Example 1.

Figure 10B:
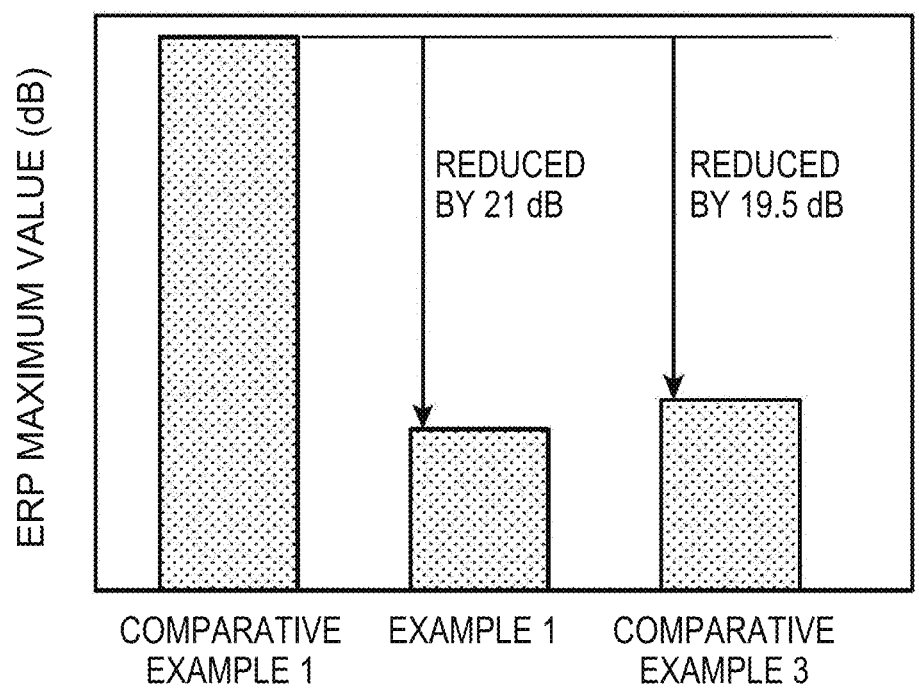
FIG. 10B is a graph illustrating an ERP maximum value in each of Example 1 and Comparative Examples 1 and 3.

As illustrated in FIG. 10B, in the model 6 according to Comparative Example 3, the ERP maximum value can be reduced by 19.5 dB from that in the model according to Comparative Example 1. The degree of reduction of the ERP maximum value in Comparative Example 3 is slightly smaller than that in the analysis model 5 according to Example 1.

In the analysis model 5 according to Example 1, the frequency band in which the loss energy rate caused by the damping member 51 is large is wider than that in the model 6 according to Comparative Example 3. This will be described with reference to FIG. 11.

Figure 11A:
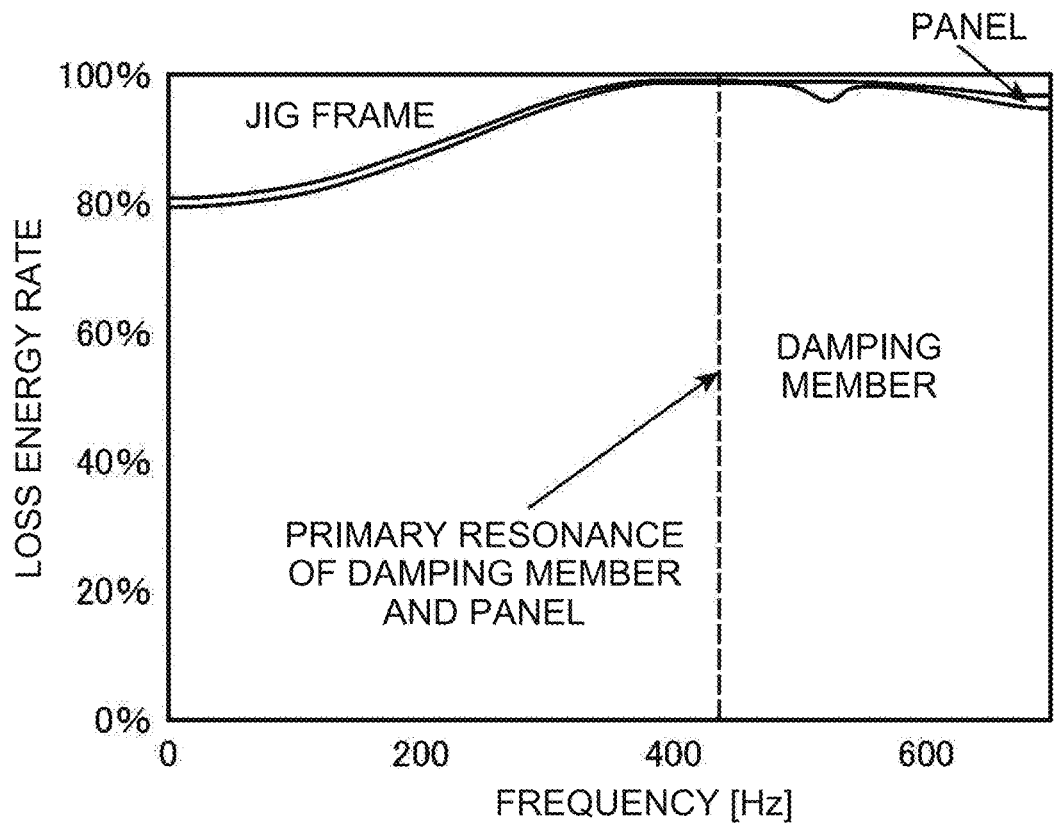
FIG. 11A is a graph illustrating a rate of contribution of a damping member for each resonance frequency using an analysis model according to Example 1.
Figure 11B:
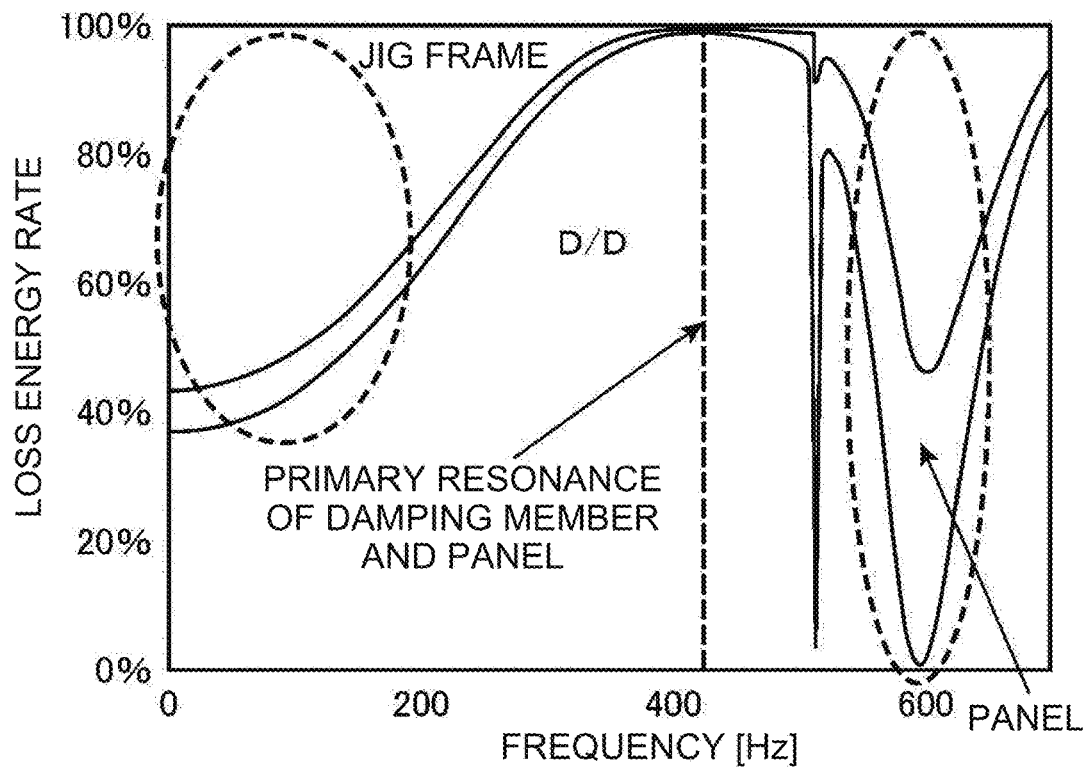
FIG. 11B is a graph illustrating a rate of contribution of a damping member (D/D) for each resonance frequency using the analysis model according to Comparative Example 3.

As illustrated in FIG. 11A, in the analysis model 5 according to Example 1, the damping member 51 occupies 80% or more of the loss energy rate in all of the frequencies. In contrast, as illustrated in FIG. 11B, in the model 6 according to Comparative Example 3 using the D/D 61, the D/D 61 occupies a large proportion in a frequency (around 400 Hz) in which the D/D 61 resonates, but the loss energy rate is largely reduced in the other frequencies in which the D/D 61 does not resonate (a portion surrounded by a broken line).

Accordingly, it is understood that in the analysis model 5 according to Example 1, the frequency band in which the loss energy rate of the damping member 51 is large is wider than that in the model 6 according to Comparative Example 3 using the D/D 61.

7. Examination of Configuration of Damping Member

A structure of a damping member that can provide a vibration damping effect to various kinds of structures was examined. The examination results will be described with reference to FIGS. 12 to 14.

Figure 12A:
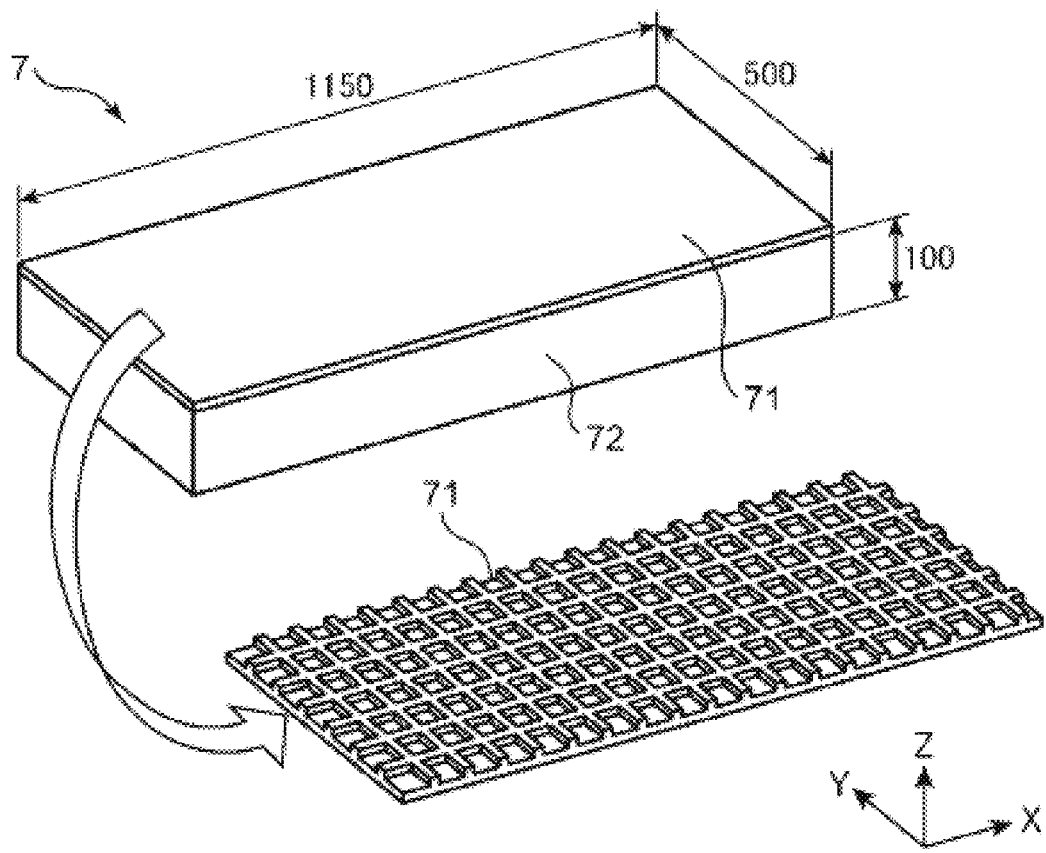
FIG. 12A is a perspective view illustrating a configuration of an analysis model.
Figure 12B:
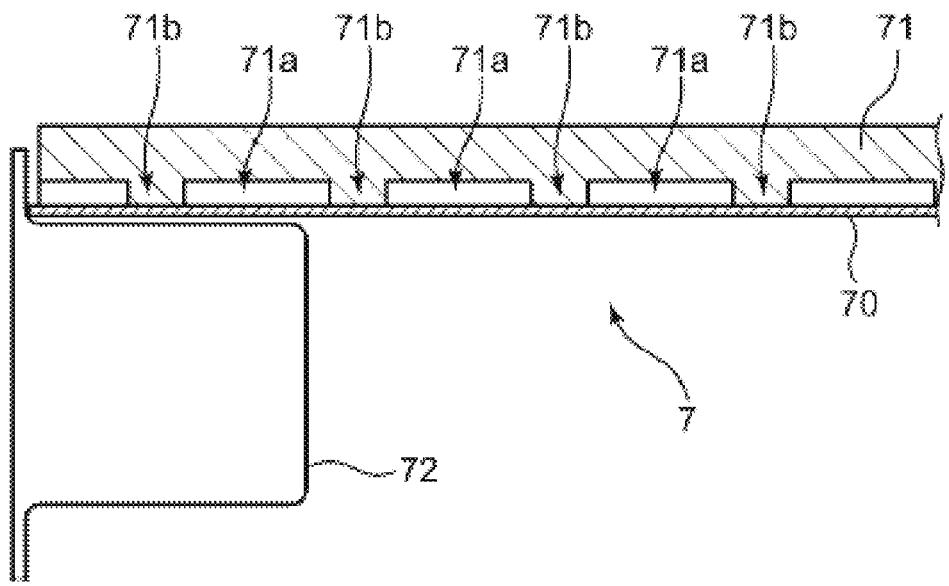
FIG. 12B is a cross-sectional view illustrating a part of the configuration of the analysis model.

As illustrated in FIGS. 12A and 12B, an analysis model 7 used in this examination includes a panel (first member) 70, a damping member (second member) 71, and a jig frame 72. As illustrated in FIG. 12B, the panel 70 is inserted between the damping member 71 and the jig frame 72.

In the damping member 71, spacing portions 71a and joined portions 71b are formed so as to be alternately repeated in both of the X direction and the Y direction. The joined portion 71b is a portion in which an end surface thereof is joined to the panel 70. The spacing portion 71a is a portion formed in a state of being recessed so as to be spaced apart from the panel 70 in the Z direction in a state where the joined portion 71b of the damping member 71 is joined to the panel 70. That is, the spacing portion 71a is a recess, which is an unjoined portion not joined to the panel 70.

Note that as illustrated in FIG. 12A, the analysis model 7 has an X-direction dimension of 1150 mm, a Y-direction dimension of 500 mm, and a Z-direction dimension of 100 mm.

As illustrated in FIG. 12B, dimensions of the spacing portion 71a of the damping member 71 are denoted by Lr1, Lr2, and Dr. Desirable values of the dimensions Lr1, Lr2, and Dr were examined by using Examples 4 to 6.

Here, where Lr1=Lr2, in each of Examples 4 to 6, (Example 4)>(Example 5)>(Example 6). In addition, regarding Dr, (Example 4)=(Example 5)=(Example 6).

Note that in Examples 4 to 6, the following members were used as the panel 70, the damping member 71, and the jig frame 72.

(1) Panel 70
Shape: flat plate
Material: iron (Fe)
(2) Damping Member 71
Shape: waffle shape
Material: acrylic foamed material (porous material)
(3) Jig Frame 72
Shape: same shape as the jig frame 52 of Example 1
Material: iron (Fe)

Characteristics of the materials used in this examination are illustrated in the table below.

TABLE 2

| | Iron/acrylic foamed material |
|---|---|
| Young's modulus [MPa] | 171583333% |
| Loss coefficient | 0.13% |

Figure 13A:
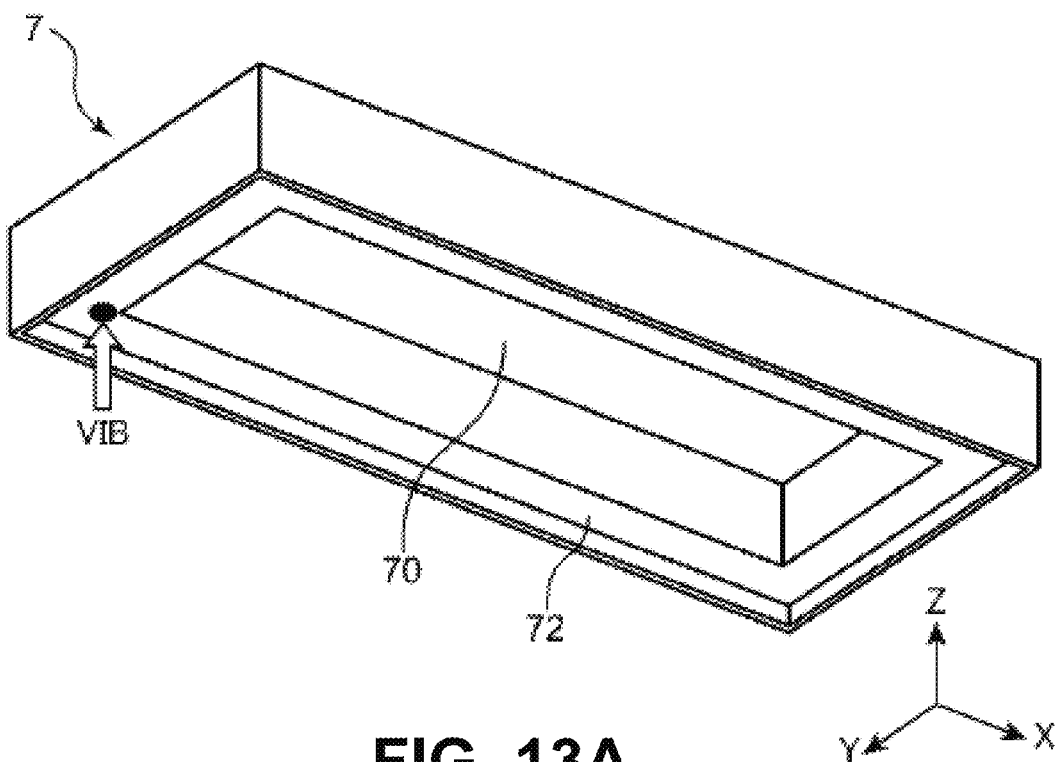
FIG. 13A is a perspective view illustrating a location to which vibration is added in the analysis model.
Figure 13B:
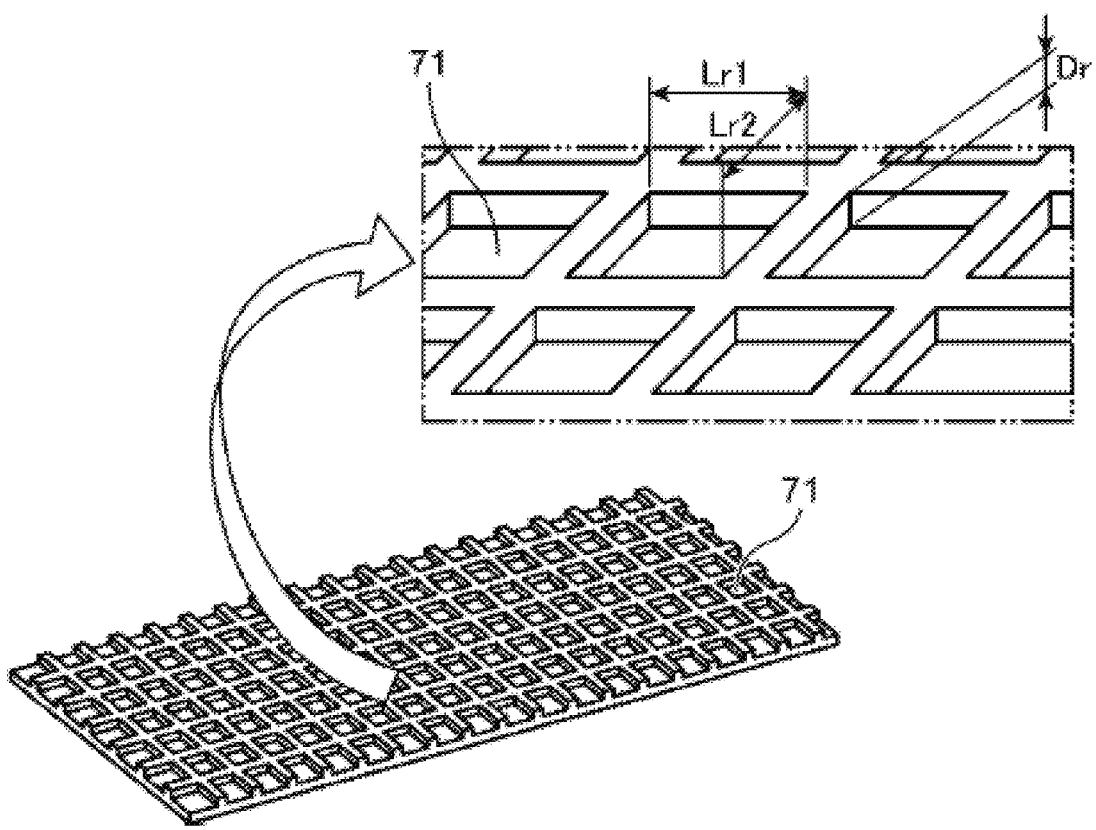
FIG. 13B is a perspective view illustrating a configuration of a damping member.

As illustrated in FIG. 13(a), vibration was input to the jig frame 72 in the Z direction in each of the analysis models 7 of Examples 4 to 6 (VIB).

Figure 14A:
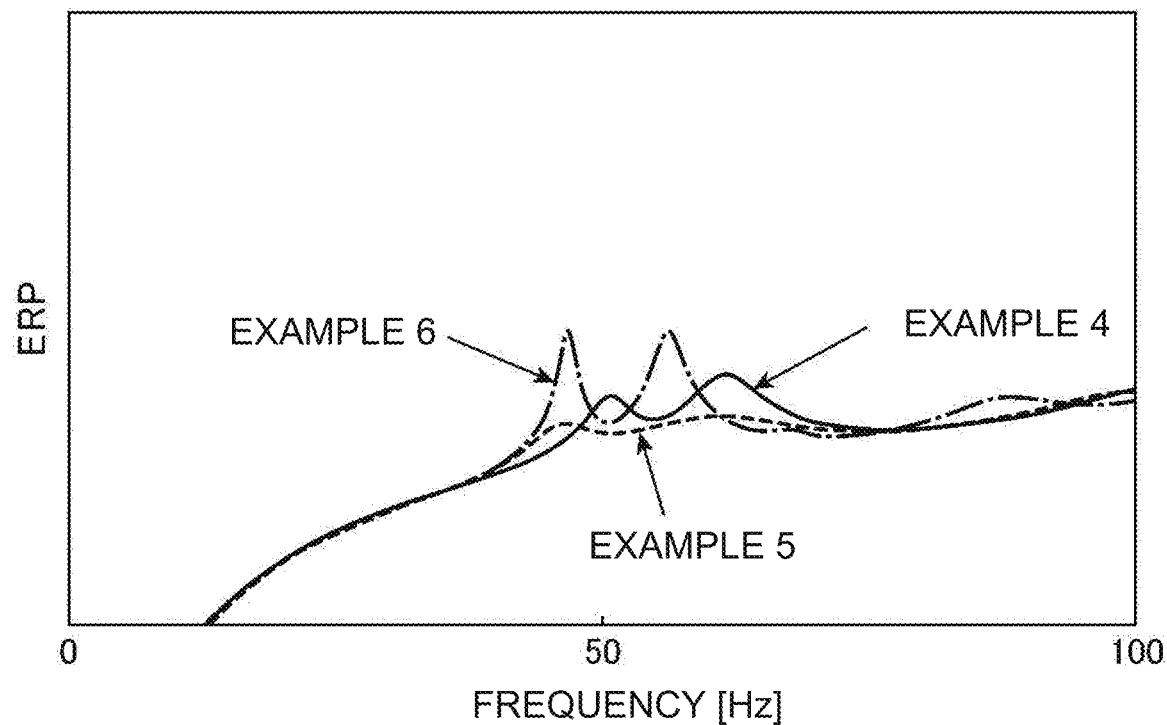
FIG. 14A is a graph illustrating an ERP of a panel for each frequency in each of Examples 3 to 5.

As illustrated in FIG. 14A, in the model of Example 4, a peak appeared around 50 Hz and around 60 Hz in the ERP of the panel 70. In the model of Example 5, a low peak appeared around 45 Hz and around 60 Hz in the ERP of the panel 70. In the model of Example 6, a slightly high peak appeared around 45 Hz and around 55 Hz in the ERP of the panel 70.

Figure 14B:
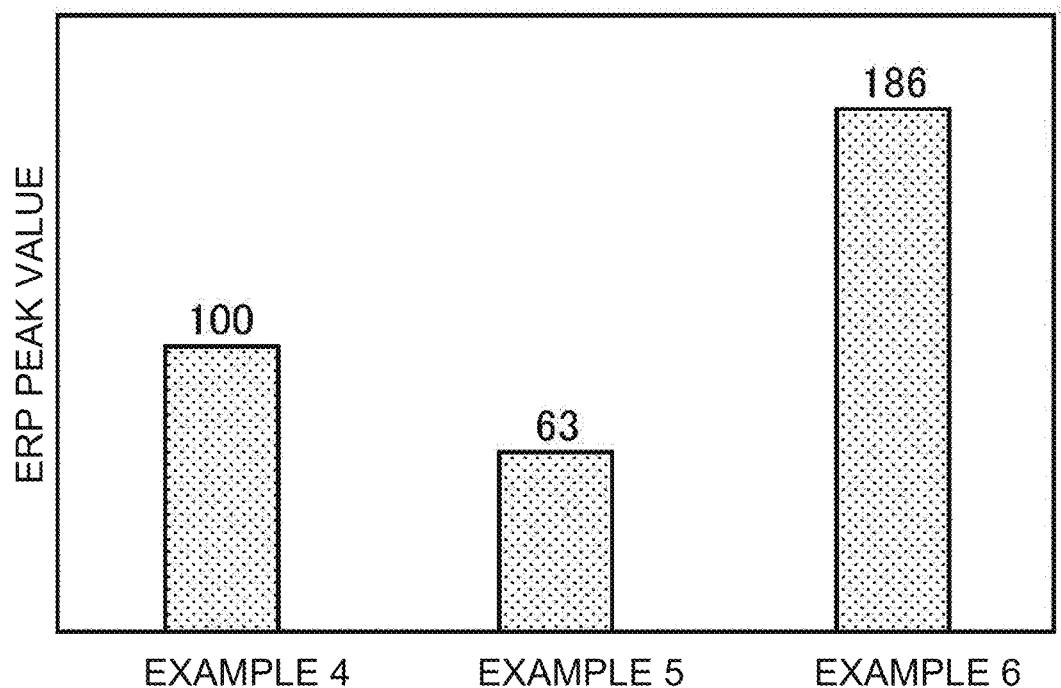
FIG. 14B is a graph illustrating an ERP peak value of the panel in each of Examples 3 to 5.

As illustrated in FIG. 14B, regarding the ERP peak values in Examples 4 to 6, when the ERP peak value in the model of Example 4 is "100", the ERP peak value in the model of Example 5 is "63" and the ERP peak value in the model of Example 6 is "186".

From the results above, it is understood that in the case where a lattice shape is adopted as the shape of the joined portions 71b in a plan view from the Z direction, the model of Example 5 with the pitch of the rib (Lr1, Lr2) being 100 mm can most reduce the vibration level of the primary resonance of the panel 70. Note that in this case, the primary semi-resonance of the damping member 71 was present in a frequency range close to the primary resonance frequency of the panel 70.

On the other hand, in the model of Example 4 with the pitch of the rib (Lr1, Lr2) being 50 mm, the resonance frequency of the damping member 71 was present in a frequency range higher than the primary resonance frequency of the panel 70. In addition, in the model of Example 6 with the pitch of the rib (Lr1, Lr2) being 150 mm, the resonance frequency of the damping member 71 was present in a frequency range lower than the primary resonance frequency of the panel 70.

From the above, it is considered that even in the case of adopting the damping member 71 with the structure (waffle shape) in which the recesses (spacing portions) 71a and the joined portions 71b are alternately repeated in both of the X direction and the Y direction, similarly to the analysis model 5 according to Example 1, it is important to cause the semi-resonance of the spacing portions 71*a* not joined to the panel 70 to coincide with the primary resonance frequency of the panel 70.

Note that although not described in detail, the present inventors have obtained results showing the same tendency regardless of the size of Dr in the damping member 71.

8. Examination of Loss Coefficient of Damping Member

To obtain a high vibration damping effect in a panel, a desirable loss coefficient of a damping member was examined. The examination results were illustrated in FIG. 15.

This examination used a panel as described below.

Material: iron (Fe)

Thickness: 2.4 mm

Note that a damping member used herein was one with the same structure as the damping member 71 of the model 7.

Furthermore, a model having no damping member was prepared for comparison.

Figure 15:
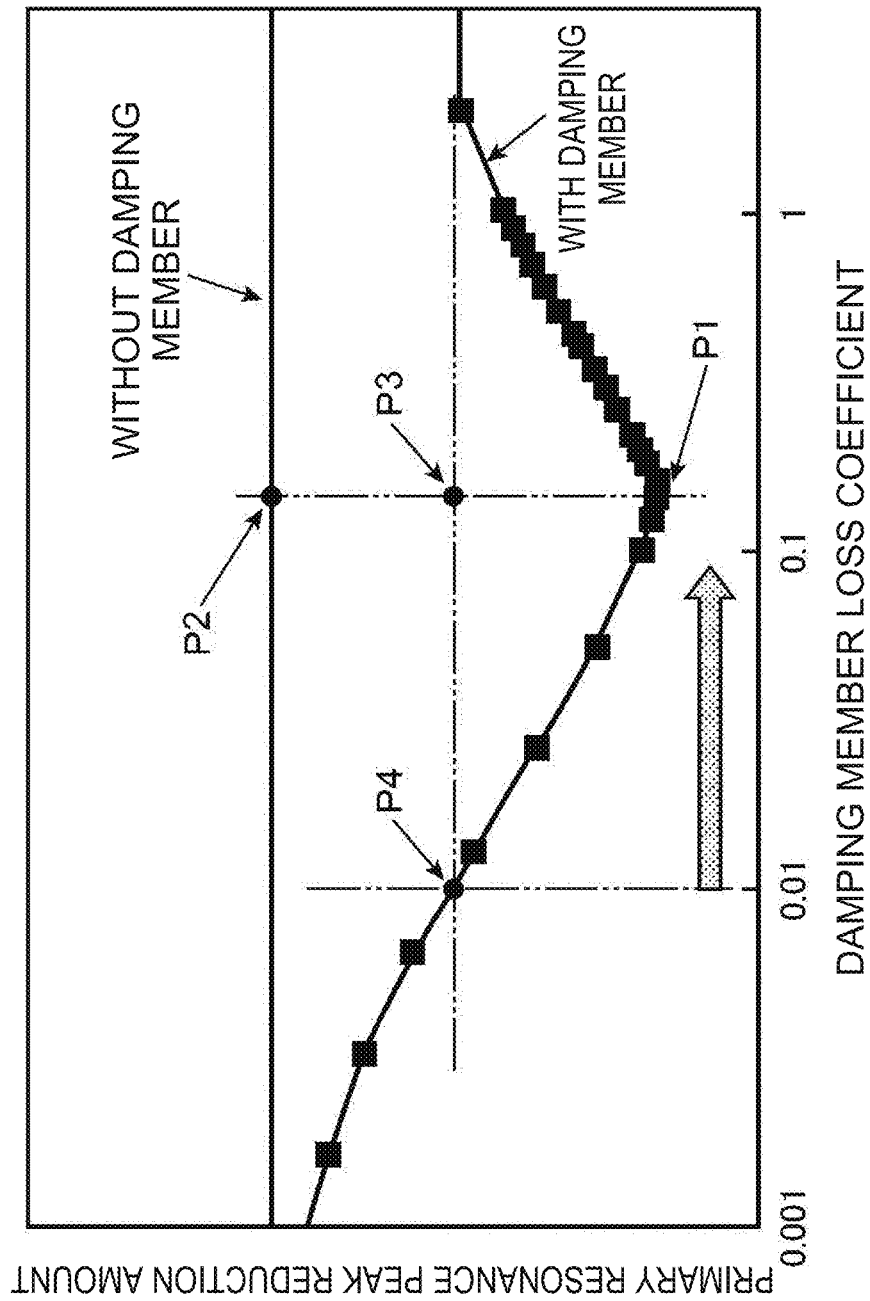
FIG. 15 is a graph illustrating a relationship between a loss coefficient and a primary resonance peak reduction amount in a damping member.

As illustrated in FIG. 15, in a model including the damping member, in the primary resonance peak reduction amount, the loss coefficient gradually decreases from "0.001" to "0.1". Then, on the contrary, the loss coefficient gradually increases from a point slightly larger than "0.1".

In the model including the damping member, a point having the smallest primary resonance peak reduction amount is P1. A perpendicular line passing through P1 is drawn on the graph. In this case, an intersection with a characteristic line of the model having no damping member is denoted by P2. Then, a line passing through a midpoint P3 between P1 and P2 and parallel to the horizontal axis is drawn on the graph. At this case, an intersection with a characteristic line of the model including the damping member is denoted by P4.

The loss coefficient at P4 is "0.01". Accordingly, as illustrated in Table 2, in the case where the panel is formed of iron (Fe), setting the loss coefficient of the damping member (acrylic foamed material) to "0.01" or more enables to secure 50% or more of the maximum effect as compared with the model having no damping member.

9. Effects

In the vibration damping structure 1 according to the present embodiment, the damping member 11 attached to the panel 10 has the joined portions 11*b* and the spacing portions (unjoined portions) 11*a*. The damping member 11 is formed so as to be higher in damping than the panel 10 (so as to have a larger loss coefficient). Furthermore, the resonance frequency of the damping member 11 is set to be substantially the same as the primary resonance frequency of the panel 10. In the vibration damping structure 1, vibration is input from the panel 10 to the damping member 11 via the joined portions 11*b*, and the spacing portions 11*a* of the damping member 11 resonate without being constrained by the panel 10. Accordingly, in the vibration damping structure 1, strain energy can be stored in the joined portions 11*b* of the damping member 11.

Therefore, in the vibration damping structure 1, a high vibration damping effect can be obtained without reduction in rigidity of the panel 10 which is a structure.

Furthermore, in the vibration damping structure 1, the spacing portions 11*a* of the damping member 11 are spaced apart from the panel 10 in the Z direction with an interval. Thus, in the case where vibration is input from the panel 10, resonance in the spacing portions 11*a* is hardly constrained by the panel 10.

Furthermore, in the vibration damping structure 1, no through hole is formed on the bottom surface (spacing surface) 11*c* of the recess which is the spacing portion 11*a*.

Thus, the resonance mode when the spacing portions 11*a* of the damping member 11 resonate by vibration input from the panel 10 is hardly inhibited.

Furthermore, in the vibration damping structure 1, the joined portion 11*b* is formed as the rib-shaped portion, so that the resonance mode when the spacing portions 11*a* of the damping member 11 resonate by vibration input from the panel 10 is hardly inhibited.

Furthermore, in the vibration damping structure 1, the damping member 11 has the structure in which the joined portions 11*b* and the spacing portions 11*a* are alternately disposed in both of the X direction and the Y direction. Thus, in the vibration damping structure 1, a plurality of resonance surfaces are provided, so that it becomes easier to match the resonance point of the damping member 11 with the resonance point of the panel 10.

Furthermore, in the vibration damping structure 1, the joined portions 11*b* of the damping member 11 are formed in the lattice shape in the plan view from the Z direction. Accordingly, in the vibration damping structure 1, a plurality of resonance surfaces are provided in the direction orthogonal to the Z direction. Therefore, in the vibration damping structure 1, it is further advantageous in matching the resonance point of the damping member 11 with the resonance point of the panel 10.

Furthermore, in the vibration damping structure 1, the damping member 11 is formed such that the primary resonance frequency of the damping member 11 and the primary resonance frequency of the panel 10 are substantially the same. In the case where the primary resonance frequency of the damping member 11 and the primary resonance frequency of the panel 10 are thus substantially the same, effective vibration damping is possible.

Furthermore, in the vibration damping structure 1, the damping member 11 is formed with the porous material (acrylic foamed material, as an example). Thus, effective vibration damping is possible while achieving weight reduction as compared with the case where the damping member is formed with a solid material.

Furthermore, in the vibration damping structure 1, the panel 10 is formed with the metal material (iron (Fe), as an example), and the loss coefficient of the damping member 11 is set to 0.01 or more. Accordingly, it is possible to obtain a remarkable effect of vibration damping as compared with the case where the vibration damping structure 1 is not adopted.

Furthermore, in the vibration damping structure 1, the joined portions 11*b* and the spacing portions 11*a* in the damping member 11 are integrally formed. Accordingly, vibration input from the panel 10 via the joined portions 11*b* is smoothly transmitted to the spacing portions 11*a* as compared with the case where the joined portions 11*b* and the spacing portions 11*a* are separately formed. Therefore, in the vibration damping structure 1, the spacing portions 11*a* of the damping member 11 resonate, so that it is advantageous in storing strain energy in the joined portions 11*b* and also further advantageous in obtaining an effect of vibration damping.

As described above, in the vibration damping structure 1 according to the present embodiment, a high vibration damping effect can be obtained without reduction in rigidity of the panel 10 itself which is a structure.

Note that in the present embodiment, although the structure in which the bottom surface 11*c* of the spacing portion 11*a* is spaced apart from the panel 10 has been adopted in the spacing portion 11*a* of the damping member 11 as an example, it is sufficient in the present disclosure that the unjoined portion in which the damping member 11 is not joined to the panel 10 is formed.

[Modification 1]

A vibration damping structure 2 according to Modification 1 will be described with reference to FIG. 19. Note that in FIG. 19, although only one cross-section of the vibration damping structure 2 is extracted and illustrated, the same structure as the one illustrated in FIG. 19 is also provided in the depth direction of the paper surface.

Figure 19:
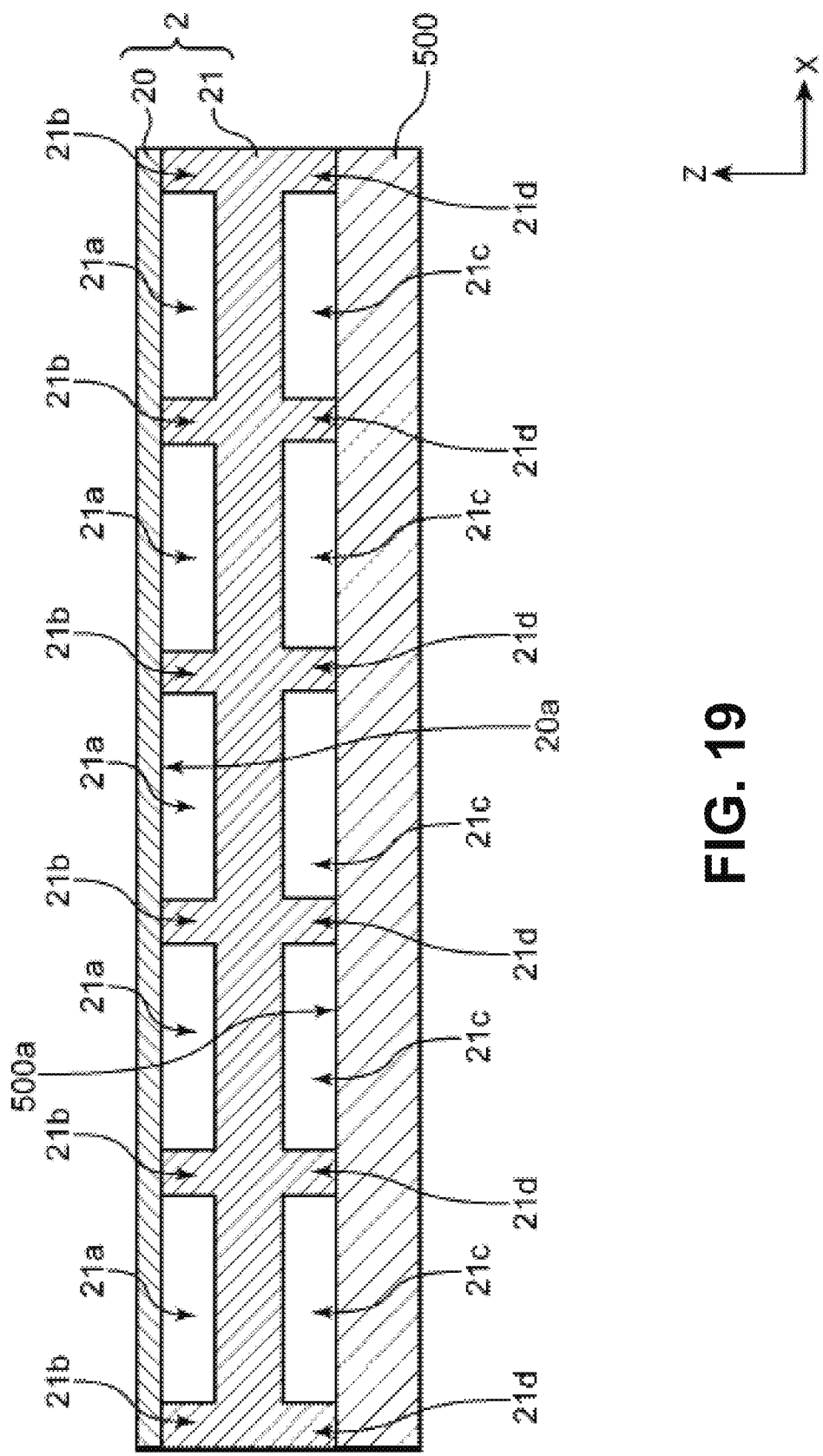
FIG. 19 is a cross-sectional view illustrating a vibration damping structure according to Modification 1.

As illustrated in FIG. 19, the vibration damping structure 2 according to the present modification also includes a panel (first member) 20 which is a structure and a damping member (second member) 21. The panel 20 is a member formed in a flat plate shape, similarly to the panel 10 of the vibration damping structure 1 according to the above embodiment.

The damping member 21 has a plurality of spacing portions (first recesses) 21a and a plurality of joined portions 21b on the side joined to the panel 20 (the Z-direction upper side in FIG. 19). The damping member 21 is joined to the panel 20 by each of the plurality of joined portions 21b. The spacing portions 21a are formed between adjacent joined portions 21b in the X direction and the direction orthogonal to the paper surface and are spaced apart from the panel 20 in the Z direction.

In the vibration damping structure 2 according to the present modification, the damping member 21 also has a plurality of spacing portions (second recesses) 21c and a plurality of joined portions 21d on the side opposite to the side joined to the panel 20 (the Z-direction lower side in FIG. 19). The disposition form of the spacing portions 21c and the joined portions 21d is the same as the disposition form of the spacing portions 21a and the joined portions 21b. The spacing portions 21a and the spacing portions 21c are disposed so as to overlap with each other when the spacing portions 21a and the spacing portions 21c are viewed in plan from the Z direction.

In the vibration damping structure 2 according to the present modification, even in the case where a base member 500 which is a structure is joined to the damping member 21 on the side opposite to the panel 20 in the Z direction (the Z-direction lower side in FIG. 19), resonance in the spacing portions 21a is hardly inhibited. That is, the spacing portions 21c spaced apart from the base member 500 are formed at an area on the Z-direction lower side with respect to the spacing portions 21a, and thus even the joined portions 21d are joined to a main surface 500a of the base member 500, the resonance mode of the spacing portions 21a is hardly inhibited, so that it is advantageous in storing strain energy in the joined portions 21b and also further advantageous in obtaining an effect of vibration damping.

[Modification 2]

A vibration damping structure 3 according to Modification 2 will be described with reference to FIG. 20. Note that also in FIG. 20, although only one cross-section of the vibration damping structure 3 is extracted and illustrated, the same structure as the one illustrated in FIG. 20 is also provided in the depth direction of the paper surface.

Figure 20:
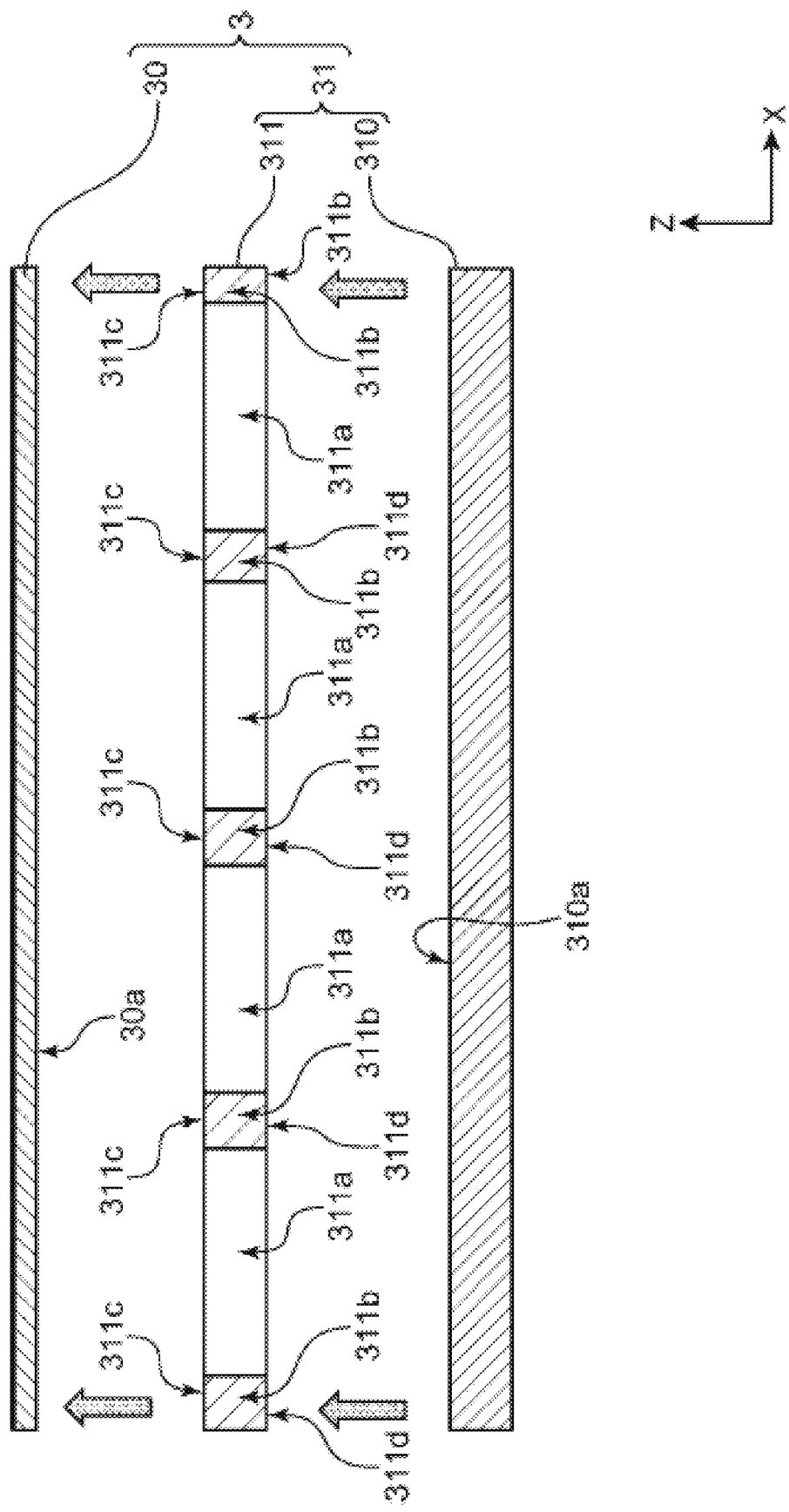
FIG. 20 is an exploded cross-sectional view illustrating a vibration damping structure according to Modification 2.

As illustrated in FIG. 20, the vibration damping structure 3 according to the present modification includes a panel (first member) 30 which is a structure and a damping member (second member) 31. The panel 30 is a member formed in a flat plate shape, similarly to the panels 10 and 20 in the vibration damping structure 1 according to the above embodiment and the vibration damping structure 2 according to Modification 1.

In the vibration damping structure 3 according to the present modification, the damping member 31 is formed by a plate-shaped member 310 and a lattice-shaped member 311 which are joined to each other. The plate-shaped member 310 is a plate-shaped member having a thickness and is disposed substantially parallel to the panel 30. The lattice-shaped member 311 has joined portions 311b formed in a lattice shape and a plurality of spacing portions (unjoined portions) 311a each having openings on the upper and lower sides in the Z direction. The lattice-shaped member 311 is joined to a mating surface 30a of the panel 30 through a joined surface 311c and is joined to a main surface 310a of the plate-shaped member 310 through a joined surface 311d.

Although in the vibration damping structure 3 according to the present modification, the damping member 31 is formed by a combination of the plate-shaped member 310 and the lattice-shaped member 311, the vibration damping structure 3 according to the present modification has the same structure as the vibration damping structure 1 according to the above embodiment, so that the same effects described above can be obtained.

[Modification 3]

A vibration damping structure 4 according to Modification 3 will be described with reference to FIG. 21. Note that in FIG. 21, only one cross-section of the vibration damping structure 4 is extracted and illustrated.

Figure 21:
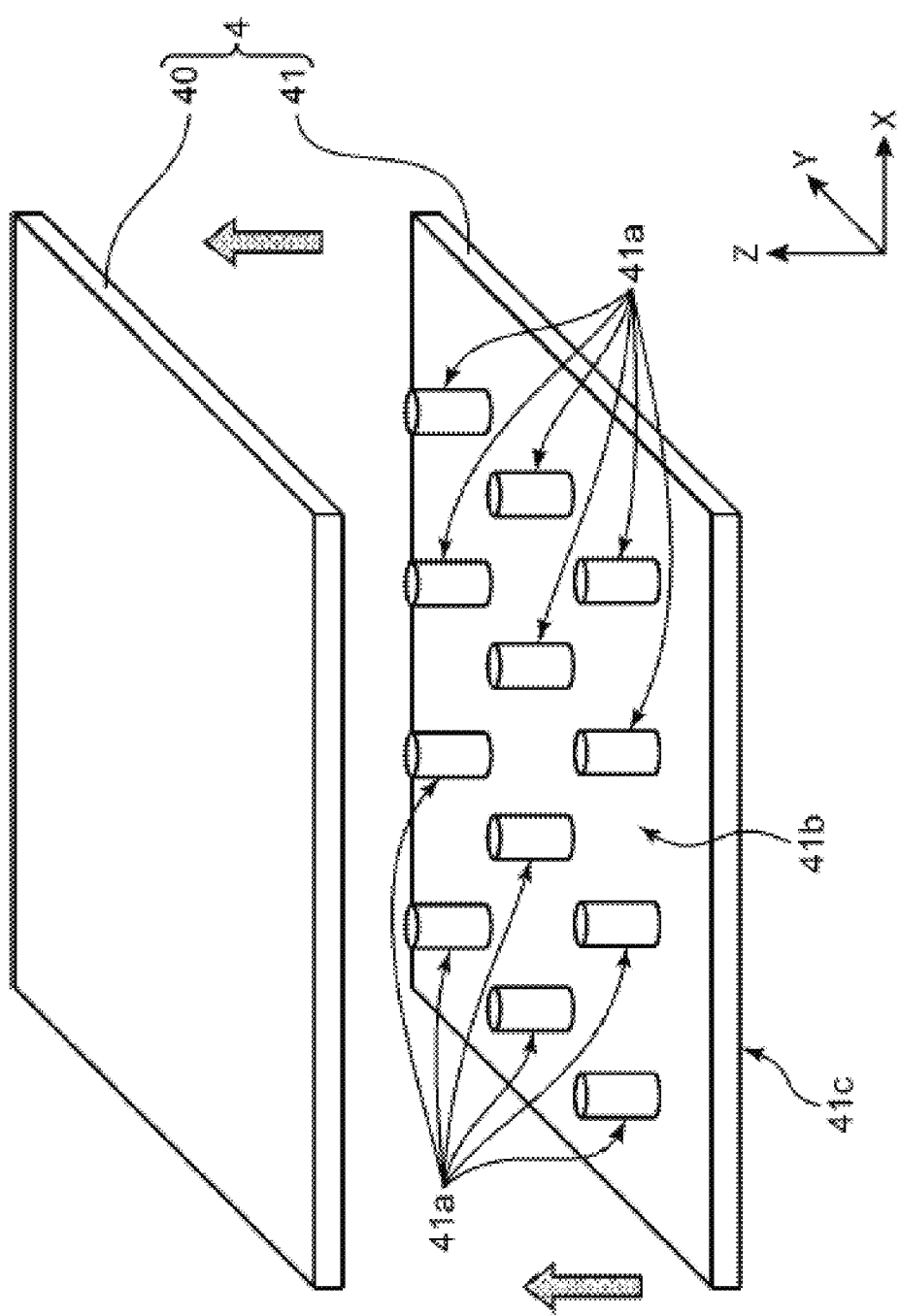
FIG. 21 is an exploded perspective view illustrating a vibration damping structure according to Modification 3.

As illustrated in FIG. 21, the vibration damping structure 4 according to the present modification includes a panel (first member) 40 which is a structure and a damping member (second member) 41. The panel 40 is a member formed in a flat plate shape, similarly to the panels 10, 20, and 30 in the vibration damping structure 1 according to the above embodiment and the vibration damping structures 2 and 3 according to Modifications 1 and 2.

In the vibration damping structure 4 according to the present modification, the damping member 41 has a plate-shaped portion 41c and a plurality of pillar portions 41a. The plate-shaped portion 41c is a plate-shaped member having a thickness and is disposed substantially parallel to the panel 40. The plurality of pillar portions 41a each have a columnar exterior shape and are provided to protrude on the Z-direction upper side of the plate-shaped portion 41c so as to be spaced apart from each other. Note that the plate-shaped portion 41c and the plurality of pillar portions 41a may be integrally formed or may be joined to each other.

In the vibration damping structure 4 according to the present modification, the panel 40 is joined to a portion on the Z-direction upper side of the plurality of pillar portions 41a. In the damping member 41, a space between adjacent pillar portions 41a in an area between the plate-shaped portion 41c and the panel 40 is a spacing portion (unjoined portion) 41b.

In the vibration damping structure 4 according to the present modification, as illustrated in FIG. 21, the damping member 41 having the plate-shaped portion 41c and the plurality of pillar portions 41a is provided, so that it is possible to reduce the rigidity of the damping member 41 as compared with the case of adopting the damping members 11, 21, and 31 having the lattice-shaped joined portions 11b, 21b, and 311b as in the above embodiment and Modifications 1 and 2. Therefore, the vibration damping structure 4 according to the present modification can be adopted in controlling the rigidity and resonance frequency of the vibration damping structure 4.

Note that in the present disclosure, it is also possible to combine the structures of the above embodiment and Modifications 1 to 3 as appropriate.

Application Example of Vibration Damping Structure

An application example of the vibration damping structure according to the present embodiment will be described with reference to FIGS. 16 to 18.

(1) Application Example to Roof Portion 101 of Vehicle Body 100

Figure 16:
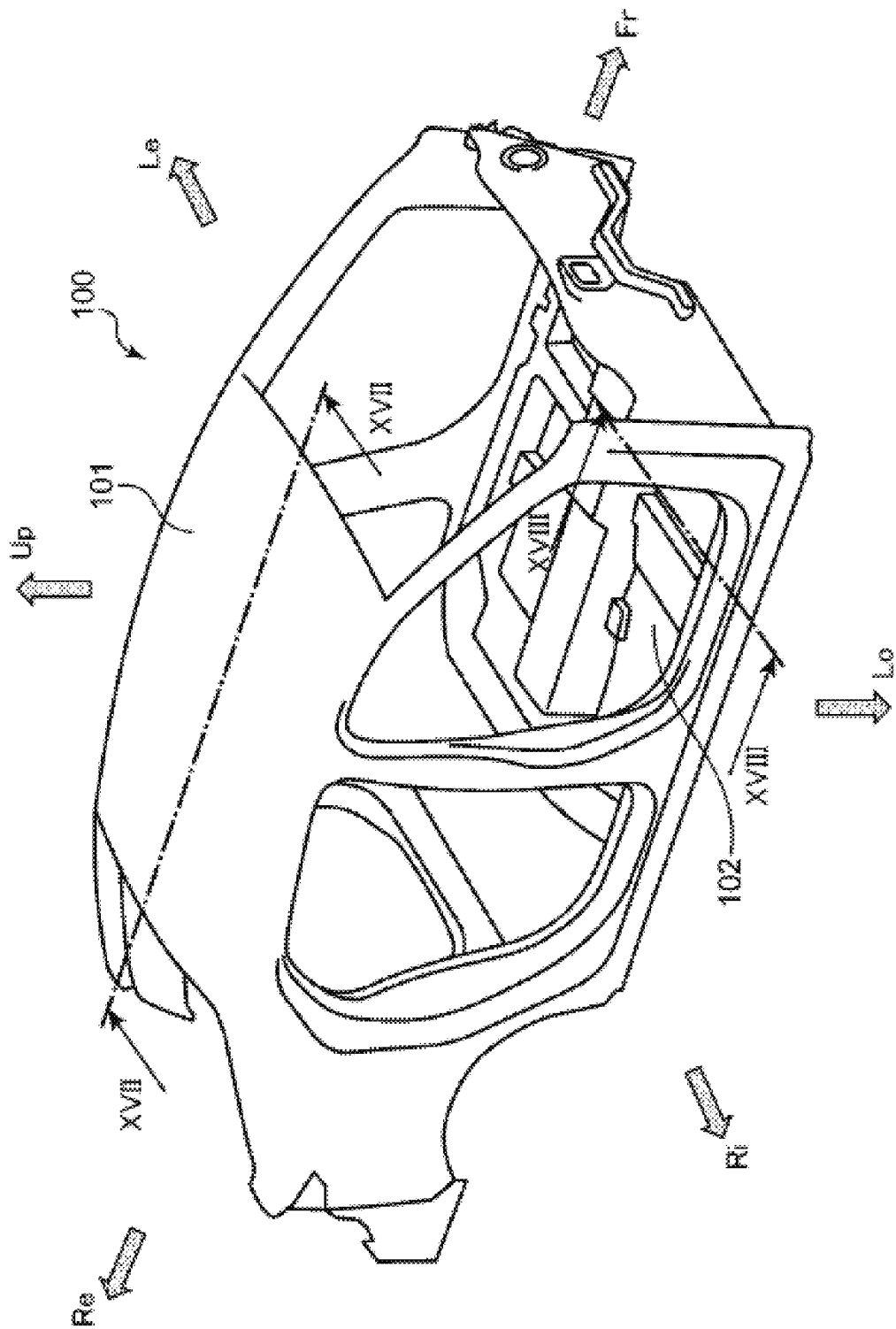
FIG. 16 is a perspective view illustrating a part of a configuration of a vehicle body.
Figure 17:
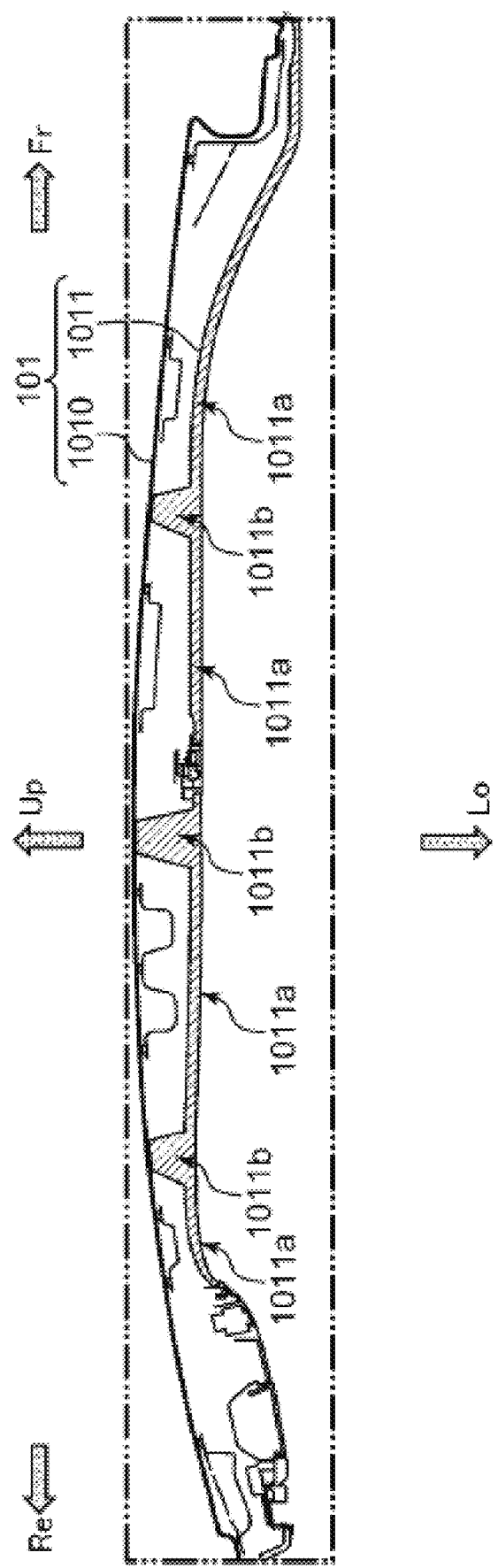
FIG. 17 is a cross-sectional view illustrating a configuration of a roof portion of the vehicle body.

FIG. 17 illustrates a cross section taken along line XVII-XVII in FIG. 16.

As illustrated in FIG. 17, in the case where the vibration damping structure 1 according to the present embodiment is applied to a roof portion 101 of a vehicle body 100, the vibration damping structure 1 is formed by a roof panel (first member) 1010 which is a structure and a top ceiling (second member) 1011 joined to the roof panel 1010 from the vehicle body inner side.

The top ceiling 1011 has a plurality of joined portions 1011b disposed so as to be spaced apart from each other in the front-rear direction of the vehicle body 100 and a spacing portion (unjoined portion) 1011a disposed between adjacent joined portions 1011b. The top ceiling 1011 is joined to the roof panel 1010 through the joined portions 1011b. The spacing portion 1011a is located on the vehicle cabin inner side from the roof panel 1010, and the spacing portion 1011a is spaced apart from the roof panel 1010 and is not joined thereto.

Note that as illustrated in FIG. 17, although the joined portions 1011b of the top ceiling 1011 are disposed at substantially equal intervals in the front-rear direction of the vehicle body 100, the joined portions 1011b are not always required to be disposed at equal intervals, and the intervals can be set as appropriate according to the vehicle body layout.

(2) Application Example to Floor Portion 102 of Vehicle Body 100

Figure 18:
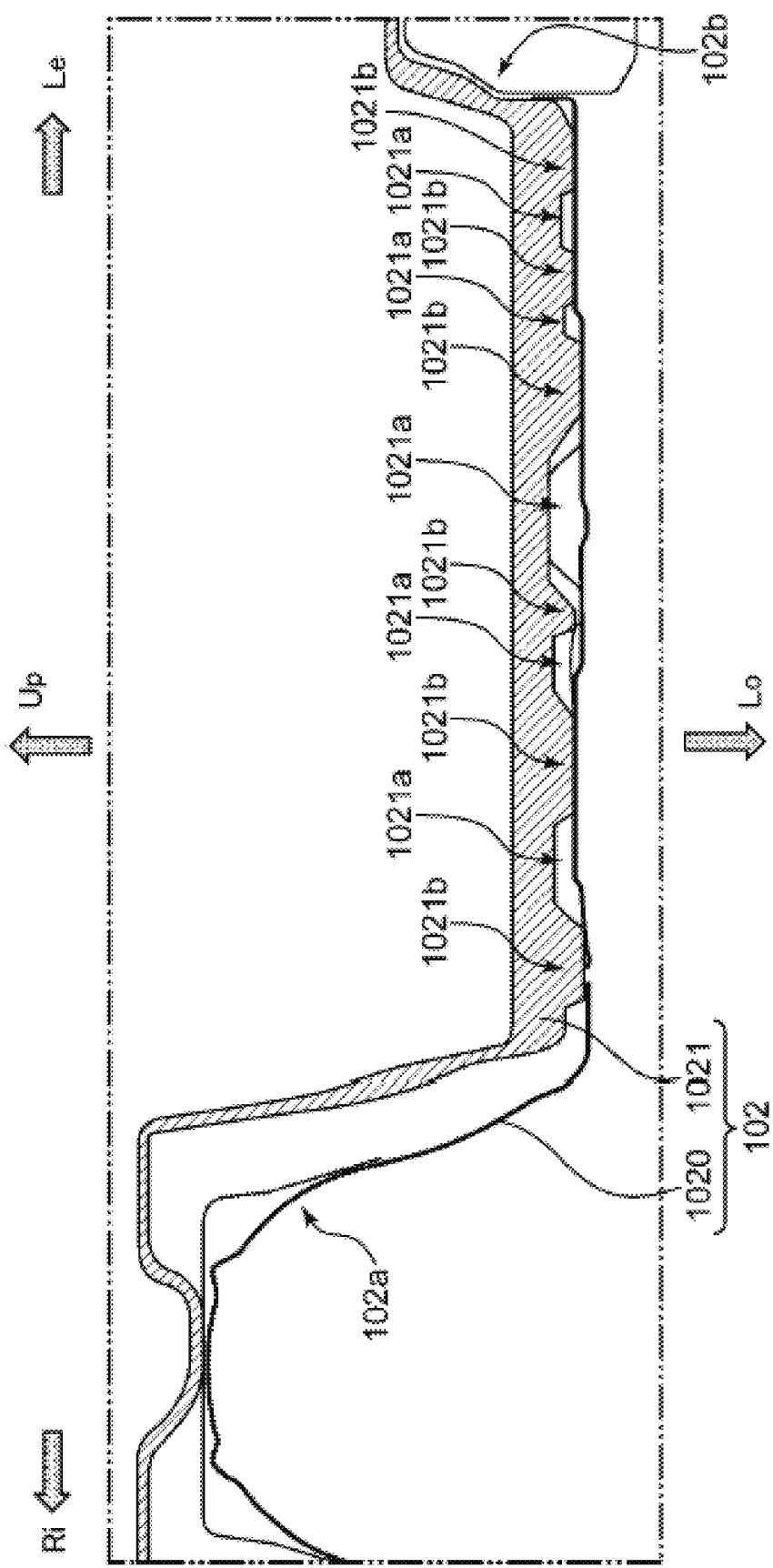
FIG. 18 is a cross-sectional view illustrating a configuration of a floor portion of the vehicle body.

FIG. 18 illustrates a cross section taken along line XVIII-XVIII in FIG. 16.

As illustrated in FIG. 18, in the case where the vibration damping structure 1 according to the present embodiment is applied to a floor portion 102 of the vehicle body 100, the vibration damping structure 1 is formed by a floor panel (first member) 1020 which is a structure and a floor mat (second member) 1021.

The floor mat 1021 has a plurality of joined portions 1021b disposed so as to be spaced apart from each other in the vehicle width direction and a spacing portion (unjoined portion) 1021a disposed between adjacent joined portions 1021b. The floor mat 1021 is joined to the floor panel 1020 through the joined portions 1021b between a tunnel portion 102a and a side sill 102b. The spacing portion 1021a is located on the vehicle cabin inner side from the floor panel 1020, and the spacing portion 1021a is spaced apart from the floor panel 1020 and is not joined thereto.

Note that as illustrated in FIG. 18, although the joined portions 1021 of the floor mat 1021 are disposed in a state of being not at equal intervals, the joined portions 1021b may be disposed at equal intervals, and the intervals can be set as appropriate according to the vehicle body layout.

Note that although the roof portion 101 and the floor portion 102 in the vehicle body 100 have been described above as the application example of the vibration damping structure 1, the present disclosure is not limited to this. For example, the present disclosure is also applicable to a pillar (an A pillar, a B pillar, or the like) of a vehicle body. Other than a vehicle body, the present disclosure is also applicable to a part of a building, an electric appliance, a vessel, an aircraft, or the like.

REFERENCE SIGNS LIST 1 to 4 vibration damping structure
10, 20, 30, 40 panel (first member)
11, 21, 31, 41 damping member (second member)
11a, 21a, 41b, 311a spacing portion (unjoined portion)
11b, 21b, 311b joined portion
41a pillar portion (joined portion)
100 vehicle body
101 roof portion
102 floor portion
1010 roof panel (first member)
1011 top ceiling (second member)
1011a spacing portion (unjoined portion)
1011b joined portion
1020 floor panel (first member)
1021 floor mat (second member)
1021a spacing portion (unjoined portion)
1021b joined portion

The invention claimed is:

1. A vibration damping structure comprising:
a first structure; and
a second structure joined to the first structure, wherein
the second structure, in an area facing the first structure, includes:
one or more joined portions joined to the first structure; and
one or more unjoined portions disposed adjacent to the joined portions and not joined to the first structure, and
the second structure is formed such that the second structure is higher in damping than the first structure and such that a resonance frequency of the second structure is substantially same as a resonance frequency of the first structure,
wherein the one or more unjoined portions of the second structure are formed so as to be spaced apart from the first structure with an interval.

2. The vibration damping structure according to claim 1, wherein
the second structure includes at least a plurality of the joined portions, and
a spacing surface of the unjoined portion which is spaced apart from the first structure has no through hole penetrating in a direction opposite to the first structure in a joined direction of the first structure and the second structure.

3. The vibration damping structure according to claim 2, wherein the joined portion is a rib-shaped portion provided to protrude toward a side of the first structure from the spacing surface in the joined direction.

4. The vibration damping structure according to claim 3, wherein
the unjoined portion is formed having a first recess recessed toward a side opposite to the first structure in the joined direction,
the second structure, in an area on a side opposite in the joined direction to the area facing the first structure, includes a second recess formed so as to be recessed toward the first structure in the joined direction from a periphery, and
the first recess and the second recess in the second structure are disposed so as to overlap with each other when the second structure is viewed in plan from the joined direction.

5. The vibration damping structure according to claim 3, wherein the second structure includes a plurality of the joined portions and a plurality of the unjoined portions, and in the second structure, the joined portions and the unjoined portions are alternately disposed in a direction orthogonal to a joined direction of the first structure and the second structure.

6. The vibration damping structure according to claim 5, wherein the joined portions of the second structure are formed having a lattice shape when the joined portions and the first structure are viewed in plan from the joined direction.

7. The vibration damping structure according to claim 6, wherein the second structure is formed such that the resonance frequency of the second structure is substantially the same as a primary resonance frequency of the first structure.

8. The vibration damping structure according to claim 7, wherein the second structure is formed such that a primary resonance frequency of the second structure is substantially the same as the primary resonance frequency of the first structure.

9. The vibration damping structure according to claim 8, wherein the second structure is formed with a porous material.

10. The vibration damping structure according to claim 9, wherein
the first structure is a floor panel of a vehicle body, and
the second structure is a floor mat attached to a vehicle cabin inner side of the floor panel.

11. The vibration damping structure according to claim 9, wherein
the first structure is a roof panel of a vehicle body, and
the second structure is a top ceiling attached to a vehicle cabin inner side of the roof panel.

12. The vibration damping structure according to claim 11, wherein
the first structure is formed with a metal material, and
the second structure has a loss coefficient of 0.01 or more.

13. The vibration damping structure according to claim 12, wherein in the second structure, the joined portion and the unjoined portion are integrally formed.

14. The vibration damping structure according to claim 1, wherein
the second structure includes a plurality of the joined portions and a plurality of the unjoined portions, and
in the second structure, the joined portions and the unjoined portions are alternately disposed in a direction orthogonal to a joined direction of the first structure and the second structure.

15. The vibration damping structure according to claim 1, wherein the second structure is formed such that the resonance frequency of the second structure is substantially same as a primary resonance frequency of the first structure.

16. The vibration damping structure according to claim 1, wherein the second structure is formed such that a primary resonance frequency of the second structure is substantially same as a primary resonance frequency of the first structure.

17. A vibration damping structure comprising:
a first structure; and
a second structure joined to the first structure, wherein
the second structure, in an area facing the first structure, includes:
one or more joined portions joined to the first structure; and
one or more unjoined portions disposed adjacent to the joined portions and not joined to the first structure, and
the second structure is formed such that the second structure is higher in damping than the first structure and such that a resonance frequency of the second structure is substantially same as a resonance frequency of the first structure, wherein the second structure is formed with a porous material.

18. A vibration damping structure comprising:
a first structure; and
a second structure joined to the first structure, wherein
the second structure, in an area facing the first structure, includes:
one or more joined portions joined to the first structure; and
one or more unjoined portions disposed adjacent to the joined portions and not joined to the first structure, and
the second structure is formed such that the second structure is higher in damping than the first structure and such that a resonance frequency of the second structure is substantially same as a resonance frequency of the first structure, wherein
the first structure is formed with a metal material, and
the second structure has a loss coefficient of 0.01 or more.

* * * * *